(12) United States Patent
Price

(10) Patent No.: US 7,542,679 B2
(45) Date of Patent: Jun. 2, 2009

(54) OPTICAL TRANSMISSION SYSTEMS, DEVICES, AND METHOD

(75) Inventor: Alistair J. Price, Ellicott City, MD (US)

(73) Assignee: Broadwing Corporation, Austin, TX (US)

(*) Notice: Subject to any disclaimer, the term of this patent is extended or adjusted under 35 U.S.C. 154(b) by 557 days.

(21) Appl. No.: 10/782,464

(22) Filed: Feb. 19, 2004

(65) Prior Publication Data

US 2004/0228635 A1    Nov. 18, 2004

Related U.S. Application Data

(63) Continuation of application No. PCT/US02/27117, filed on Aug. 26, 2002, which is a continuation-in-part of application No. 10/227,574, filed on Aug. 23, 2002, now Pat. No. 7,340,183.

(60) Provisional application No. 60/314,600, filed on Aug. 24, 2001.

(51) Int. Cl.
    *H04J 14/02* (2006.01)
(52) U.S. Cl. ............... 398/85; 398/149; 398/203
(58) Field of Classification Search ............ 398/149, 398/159, 186–194
    See application file for complete search history.

(56) References Cited

U.S. PATENT DOCUMENTS

| | | |
|---|---|---|
| 4,545,076 A | 10/1985 | Biard et al. |
| 4,663,767 A | 5/1987 | Bodlaj et al. |
| 5,301,058 A | 4/1994 | Olshansky |
| 5,381,446 A | 1/1995 | McIntosh |
| 5,446,571 A | 8/1995 | Shabeer |
| 5,694,232 A | 12/1997 | Parsay et al. |
| 5,867,534 A | 2/1999 | Price et al. |
| 6,088,494 A * | 7/2000 | Keck et al. ............ 385/27 |
| 6,091,744 A * | 7/2000 | Sorin et al. ............ 372/20 |
| 6,118,566 A | 9/2000 | Price |
| 6,522,439 B2 | 2/2003 | Price et al. |
| 6,674,929 B2 * | 1/2004 | Feng et al. ............ 385/15 |
| 2002/0181832 A1 * | 12/2002 | Feng et al. ............ 385/15 |
| 2003/0035619 A1 * | 2/2003 | Pfeiffer ................. 385/27 |

FOREIGN PATENT DOCUMENTS

| | | |
|---|---|---|
| EP | 0 701 338 A | 3/1996 |
| EP | 1 076 430 A | 2/2001 |
| WO | WO 01/10156 A | 2/2001 |

OTHER PUBLICATIONS

International Search Report for PCT/US02/26858.
Supplemental European Search Report for Application No. EP 02 76 8674.

(Continued)

*Primary Examiner*—Dzung D Tran
(74) *Attorney, Agent, or Firm*—Thorp Reed & Armstrong, LLP

(57) ABSTRACT

A method of receiving optical channels including providing an optical band filter configured to filter at least one optical channel from a multiple channel optical signal and provide a band filtered optical signal. A periodic filter is configured to filter and/or shape one channel from the band filtered optical signal and provide the periodic filtered, shaped signal to a receiver and other optical system. The invention also relates to corresponding systems and apparatuses.

16 Claims, 23 Drawing Sheets

OTHER PUBLICATIONS

Communication from the European Patent Office Pursuant to Article 96(2).
First Examination Report of India National Phase Application No. 381/CHENP/2004.
International Search Report for PCT/US02/26858, dated Feb. 20, 2003.
Supplemental European Search Report for Application No. EP 02 76 8674, dated Nov. 10, 2006.
Communication from the European Patent Office Pursuant to Article 96(2), dated May 7, 2006.

* cited by examiner

OPTICAL TRANSMISSION SYSTEMS, DEVICES, AND METHOD

CROSS-REFERENCE TO RELATED APPLICATIONS

This application is a continuation of PCT Patent Application No. PCT/US02/27117, filed Aug. 26, 2002, which is a continuation in part of U.S. patent application Ser. No. 10/227,574, filed Aug. 23, 2002, now U.S. Pat. No. 7,340,183, which claims priority from U.S. patent application Ser. No. 60/314,600, filed Aug. 24, 2001, all of which are incorporated herein by reference.

STATEMENT REGARDING FEDERALLY SPONSORED RESEARCH OR DEVELOPMENT

Not Applicable

BACKGROUND OF THE INVENTION

The present invention is directed generally to the transmission of signals in optical communications systems. More particularly, the invention relates to systems, filtering devices, and methods for use in optical communications systems.

The development of digital technology provided the ability to store and process vast amounts of information. While this development greatly increased information processing capabilities, it was recognized that in order to make effective use of information resources it was necessary to interconnect and allow communication between information resources. Efficient access to information resources requires the continued development of information transmission systems to facilitate the sharing of information between resources. One effort to achieve higher transmission capacities has focused on the development of optical transmission systems. Optical transmission systems can provide high capacity, low cost, low error rate transmission of information over long distances.

The transmission of information over optical systems is typically performed by imparting the information in some manner onto an optical carrier by varying characteristics of the optical carrier. In most optical transmission systems, the information is imparted by using an information data stream to either directly or externally modulate an optical carrier so that the information is imparted at the carrier frequency or on one or more sidebands, with the later technique sometimes called upconversion or sub-carrier modulation ("SCM").

SCM techniques, such as those described in U.S. Pat. Nos. 4,989,200, 5,432,632, and 5,596,436, generally produce a modulated optical signal in the form of two mirror image sidebands at wavelengths symmetrically disposed around the carrier wavelength. Generally, only one of the mirror images is required to carry the signal and the other image is a source of signal noise that also consumes wavelength bandwidth that would normally be available to carry information. Similarly, the carrier wavelength, which does not carry information in an SCM system, can be a source of noise that interferes with the subcarrier signal. Modified SCM techniques have been developed to eliminate one of the mirror images and the carrier wavelength. However, "traditional" SCM techniques do not work well at high bit rates (e.g., greater than 2.5 gigabits per second). For example, mixer linearity, frequency flatness, frequency bandwidth, and group delay tend to be problematic. It is also difficult to keep power levels balanced and well controlled. Such problems and difficulties can result in significant performance degradation and/or increased cost. Modified SCM techniques have also been disclosed to utilize Manchester encoding in place of electrical carriers, such as described in U.S. Pat. Nos. 5,101,450 and 5,301,058.

Initially, single wavelength carriers were spatially separated by placing each carrier on a different fiber to provide space division multiplexing ("SDM") of the information in optical systems. As the demand for capacity grew, increasing numbers of information data streams were spaced in time, or time division multiplexed ("TDM"), on the single wavelength carrier in the SDM system as a means to better use the available bandwidth. The continued growth in demand has spawned the use of multiple wavelength carriers on a single fiber using wavelength division multiplexing ("WDM").

In WDM systems, further increases in transmission capacity can be achieved not only by increasing the transmission rate of the information on each wavelength, but also by increasing the number of wavelengths, or channel count, in the system. However, conventional systems already have the capacity to transmit hundreds of channels on a single fiber, and that number will continue to increase. As such, the cost of transmitters, receivers, and other devices can constitute a large portion of a system's cost. Therefore, the size and cost of systems will increase significantly as the number of WDM channels increase. Accordingly, there is a need to reduce the cost and size of devices in optical systems while at the same time maintaining or increasing system performance.

BRIEF SUMMARY OF THE INVENTION

The systems, devices, and methods of the present invention address the above-stated need for lower cost, higher performance optical communications systems, devices, and methods. The present invention is directed to improved systems, devices, and methods for optical filtering and receiving optical channels. The present invention can be employed, for example, in multi-dimensional optical networks, point to point optical networks, or other devices or systems, which can benefit from the improved performance afforded by the present invention.

In various embodiments, a optical band filter is followed by and used in combination with a periodic filter to provide narrow band filtering and shaping of optical channels in the system. Various band filters, such as fiber Bragg gratings, Fabry-Perot filters, thin film filters, etc. can be used in combination with Mach-Zehnder filters or other periodic filters. Band and periodic filters of the present invention can include both fixed and tunable filters depending upon the desired application. In addition, the band and periodic filters can employ different numbers of stages and filtering technologies within the scope of the present invention.

In various embodiments, the optical band filter is configured to filter a single optical channel from a multiple channel signal. The channel filtered by the band filter is provided to the periodic filter, which filters and shapes the single channel to provide a single filtered, shaped channel to a receiver and/or a further optical system. In other embodiments, the band filter is used to provide multiple channels to the periodic filter, which can be configured to provide a single filtered, shaped channel from the multiple channel band filtered signal. The single filtered, shaped optical signal channel can include multiple channels that can be coherently detected in a receiver.

Those and other embodiments of the present invention, as well as receivers, systems, and methods according to the present invention, will be described in the following detailed description. The present invention addresses the needs described above in the description of the background of the invention by providing improved systems, devices, and methods. These advantages and others will become apparent from the following detailed description.

BRIEF DESCRIPTION OF THE DRAWINGS

Embodiments of the present invention will now be described, by way of example only, with reference to the accompanying drawings, wherein.

DETAILED DESCRIPTION OF THE INVENTION

Figure 1:
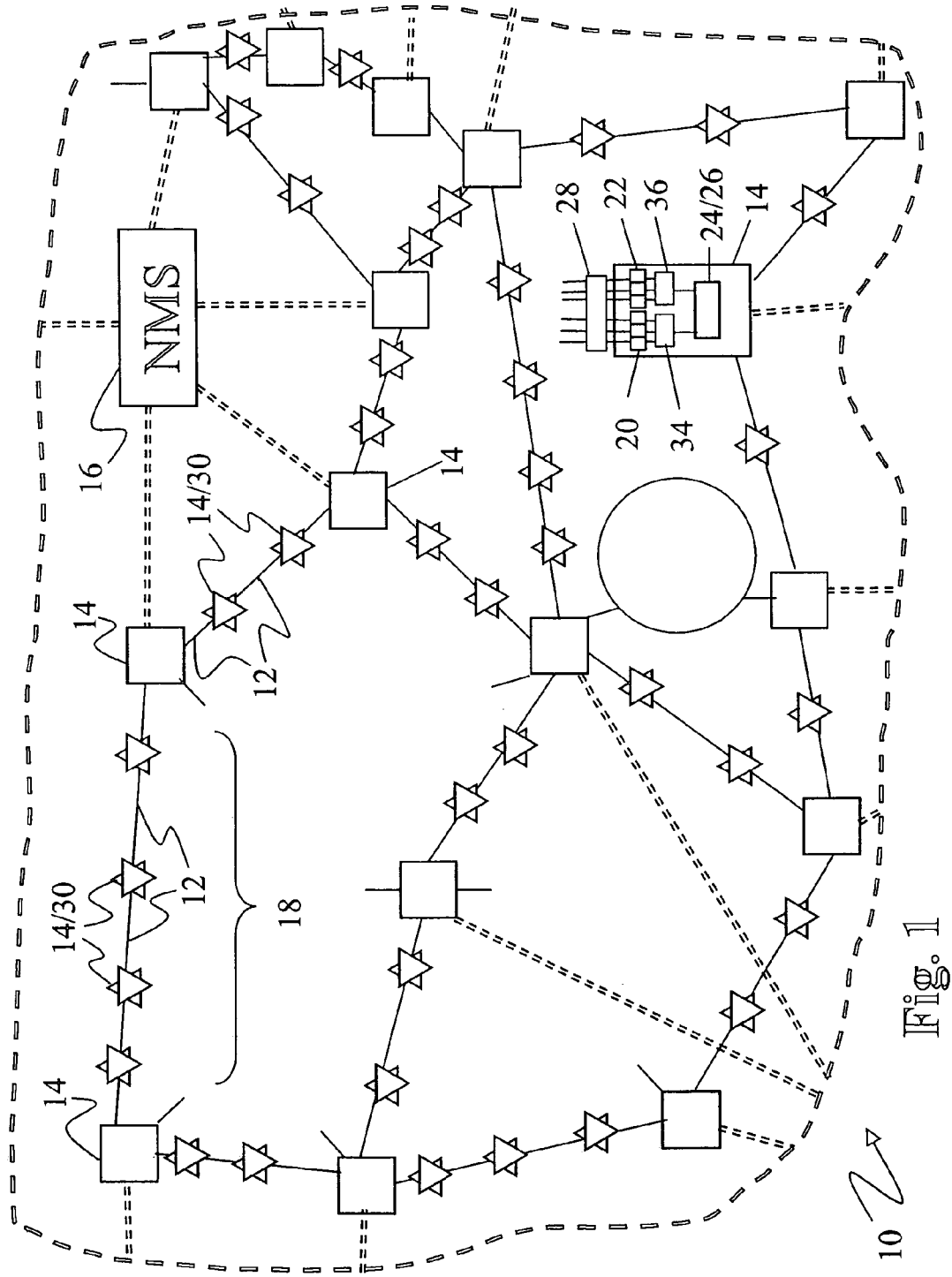
FIGS. 1 and 2 show examples optical communications systems.

FIG. 1 shows an optical communications system 10 which includes optical paths 12 connecting network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various transmission schemes, such as space, time, code, frequency, phase, polarization, and/or wavelength division multiplexing, and other types and combinations of multiplexing schemes. The system 10 can also include more or less features than those illustrated herein, such as by including a network management system ("NMS") 16 and changing the number, location, content, configuration, and connection of network elements 14.

The optical paths 12 can include guided and unguided paths or waveguides, such as one or more optical fibers, ribbon fibers, and free space devices, and can interconnect the network elements 14 establishing links 18 and providing optical communication paths through the system 10. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel.

The network elements 14 can include one or more signal processing devices including one or more of various optical and/or electrical components. The network elements 14 can perform network functions or processes, such as switching, routing, amplifying, multiplexing, combining, demultiplexing, distributing, or otherwise processing optical signals. For example, network elements 14 can include one or more transmitters 20, receivers 22, switches 24, add/drop multiplexers 26, interfacial devices 28, amplifiers 30, multiplexers/combiners 34, and demultiplexers/distributors 36, as well as filters, dispersion compensating and shifting devices, monitors, couplers, splitters, and other devices. One embodiment of one network element 14 is illustrated in FIG. 1, although many other variations and embodiments of network elements 14 are contemplated. Additional examples of network elements 14 are described in U.S. patent application Ser. No. 09/817,478, filed Mar. 26, 2001, and Ser. No.09/253,819, filed Feb. 19, 1999, both of which are incorporated herein by reference.

The optical transmitters 20 and receivers 22 are configured respectively to transmit and receive optical signals including one or more information carrying optical signal wavelengths, or channels, via the optical paths 12. The transmitters 20 include an optical carrier source that provides an optical carrier and can utilize, for example, coherent or incoherent sources, and narrow band or broad band sources, such as sliced spectrum sources, fiber lasers, semiconductor lasers, light emitting diodes, and other optical sources. The transmitters 20 often include a narrow bandwidth laser as the optical carrier source. The optical transmitter 20 can impart information to the optical carrier by directly modulating the optical carrier source or by externally modulating the optical carrier. Alternatively, the information can be upconverted onto an optical wavelength to produce the optical signal, such as by utilizing Manchester encoding as described hereinbelow. Examples of optical transmitters 20 are described in U.S. Pat. No. 6,118,566, issued Sep. 12, 2000, which is incorporated herein by reference.

Similarly, the optical receiver 22 can include various detection techniques, such as coherent detection, optical filtering, and direct detection. Tunable transmitters 20 and receivers 22 can be used to provide flexibility in the selection of wavelengths used in the system 10.

The switches 24 can take many forms and can have different levels of "granularity". "Granularity" refers to the resolution or precision with which the switching is performed. For example, WDM switches 24 can switch groups of wavelengths, individual wavelengths, or portions of wavelengths. Before being switched, the signals can be demultiplexed into the appropriate level of granularity, and after being switched the signals can be multiplexed into the desired format, using the same or different modulation schemes, wavelengths, or other characteristics.

Switches 24 can have electrical, optical, or electrical/optical switch "fabrics". The switch "fabric" describes the domain and/or manner in which the signal switching occurs. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. No. 09/119,562, filed Jul. 21, 1998, and Ser. No. 60/150,218, filed Aug. 23, 1999, and PCT Patent Application PCT/US00/23051, filed Aug. 23, 2000, all of which are incorporated herein by reference.

Switches 24 can be grouped into two categories: interfacial switches and integrated switches. Interfacial switches 24, sometimes referred to as "dedicated" switches, perform one or more O-E-O conversions of the signals. The O-E-O conversions can be either in the switch 24 itself or in a related component, such as a multiplexer 34 or demultiplexer 36. Interfacial switches 24 are located within or at the periphery of networks 10 and point to point links 18, such as between two or more point to point links 18, between two or more networks 10, or between a network 10 and a point to point link 18. Interfacial switches 24 optically separate the links 18 and/or networks 10 because optical signals are converted into electrical form before being passed to the next optical link 18 or network 10. Interfacial switches 24 are a type of interfacial device 28, which is discussed in more detail hereinbelow. In contrast, integrated switches 24 are optically integrated into the network 10 and allow optical signals to continue through the network 10, via the integrated switch 24, without an O-E-O conversion. Integrated switches 24 are sometimes called "all-optical switches", "O-O" switches, or "O-O-O" switches. A switch 24 can have both an integrated switch 24 portion and a interfacial switch 24 portion, such that some signals are switched without an O-E-O conversion, while other signals are subjected to an O-E-O conversion.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28, which subject signals to an O-E-0 conversion.

Interfacial devices 28 optically separate and act as interfaces to and between optical networks 10 and/or point to point links 18. Interfacial devices 28 perform at least one optical to electrical ("O-E") or electrical to optical ("E-O") conversion before passing signals into or out of the link 18 or network 10. Interfacial device 28 can be located within or at the periphery of networks 10, such as between two or more networks 10, between two or more point to point links 18, and between networks 10 and point to point links 18. Interfacial devices 28 include, for example, cross-connect switches, IP routers, ATM switches, etc., and can have electrical, optical, or a combination of switch fabrics. Interfacial devices 28 can provide interface flexibility and can be configured to receive, convert, and provide information in one or more various protocols, encoding schemes, and bit rates to the transmitters 20, receivers 22, and other devices. The interfacial devices 28 also can be used to provide other functions, such as protection switching.

The optical amplifiers 30 can be used to provide signal gain and can be deployed proximate to other optical components, such as in network elements 14, as well as along the optical communications paths 12. The optical amplifiers 30 can include concentrated/lumped amplification and/or distributed amplification, and can include one or more stages. The optical amplifier can include doped (e.g. erbium, neodymium, praseodymium, ytterbium, other rare earth elements, and mixtures thereof) and Raman fiber amplifiers, which can be locally or remotely pumped with optical energy. The optical amplifiers 30 can also include other types of amplifiers 30, such as semiconductor amplifiers.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more stages incorporating various multi-port device and filter combinations to multiplex, demultiplex, and/or broadcast signal wavelengths $\lambda_i$ in the optical systems 10.

The NMS 16 can manage, configure, and control network elements 14 and can include multiple management layers that can be directly and indirectly connected to the network elements 14. The NMS 16 can be directly connected to some network elements 14 via a data communication network (shown in broken lines) and indirectly connected to other network elements 14 via a directly connected network element and the optical system 10. The data communication network can, for example, be a dedicated network, a shared network, or a combination thereof. A data communications network utilizing a shared network can include, for example, dial-up connections to the network elements 14 through a public telephone system. Examples of an NMS 16 are described in U.S. patent application Ser. No. 60/177,625, filed Jan. 24, 2000, and PCT Patent Application PCT/US01/02320, filed Jan. 24, 2001, both of which are incorporated herein by reference.

Figure 2:
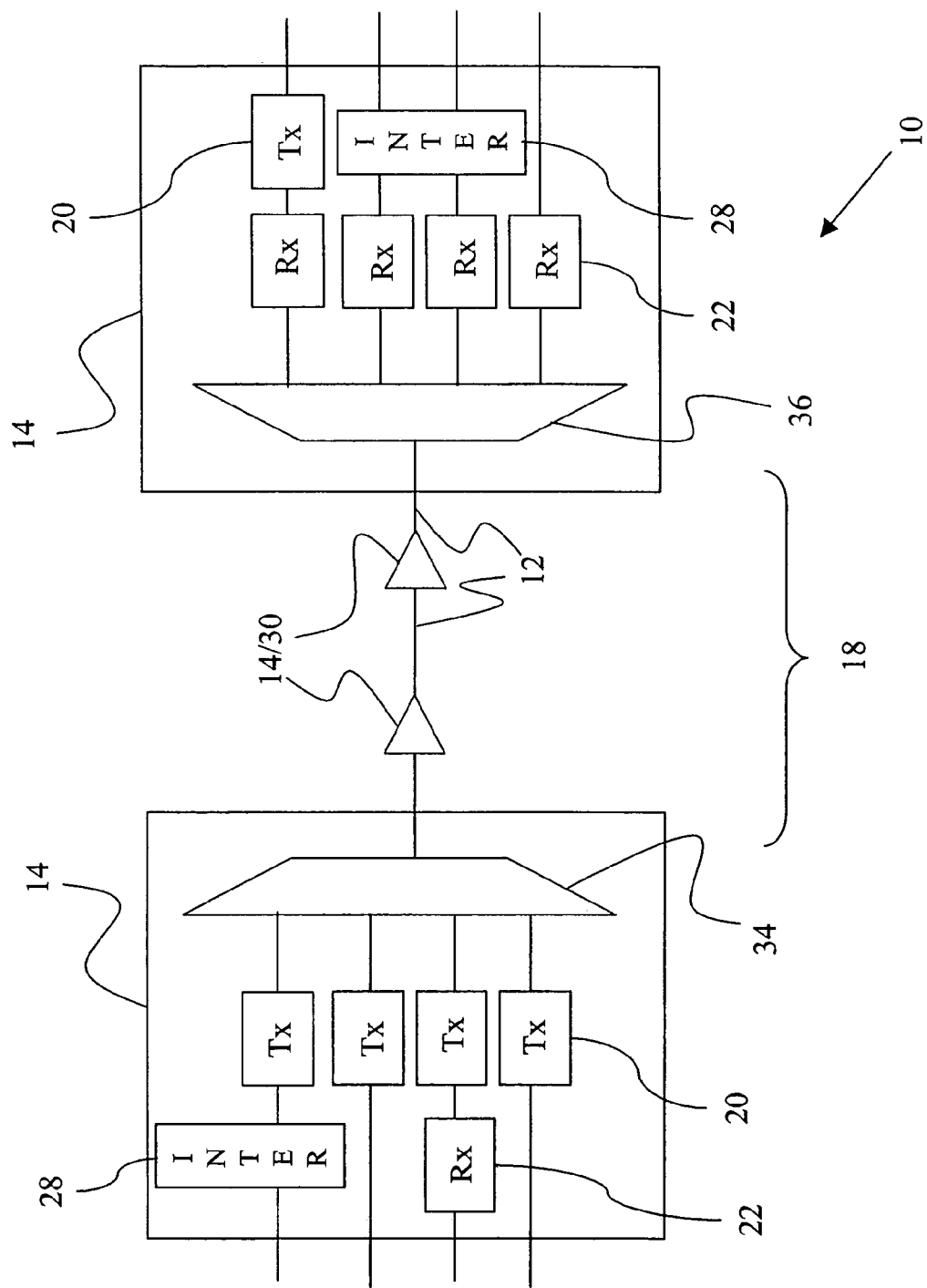

FIG. 2 shows another embodiment of the system 10 including a link 18 of four network elements 14. That system 10 can, for example, be all or part of a point to point system 10, or it may be part of a multi-dimensional, mesh, or other system 10. One or more of the network elements 14 can be connected directly to the network management system 16 (not shown). If the system 10 is part of a larger system, then as few as none of the network elements 14 can be connected to the network management system 16 and all of the network elements 14 can still be indirectly connected to the NMS 16 via another network element in the larger system 10.

Figure 3:
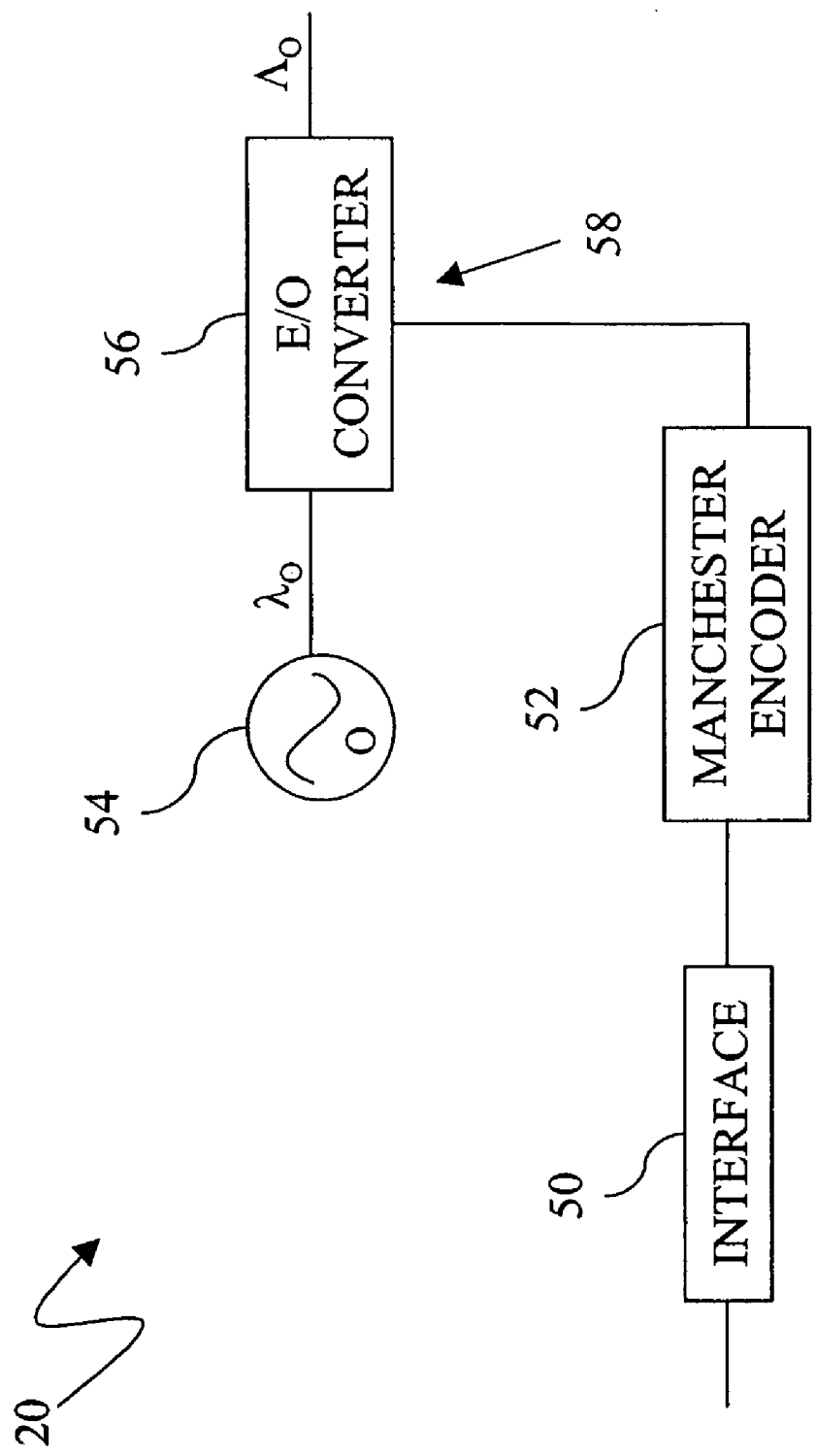
FIG. 3 shows an embodiment of a transmitter that can be used in the optical communications system.

FIG. 3 shows a transmitter 20 including an interface 50, a Manchester encoder 52, an optical carrier source 54, and an E/O converter 56 having a data input 58. The transmitter 20 can also include components other than those illustrated herein, such as amplifiers, phase shifters, isolators, filters, signal distorters, protocol processors, and other electrical, optical, and electro-optical components. The transmitter 20 can upconvert one or more data signals onto one or more sidebands of the optical carrier $\lambda_o$, without requiring the data signals to be modulated onto an electrical carrier source. The upconverted optical signal $\Lambda_o$ of the present invention does not require a Manchester decoder at the receiver 22. Rather, the sideband signal can be received in a manner analogous to other upconverted data signals.

The interface 50 provides an interface for data signals to be transmitted and can provide a connection to other systems, networks, or links. The interface 50 can be a simple connector or it can be a more sophisticated device, such as one which performs SONET section monitoring and termination functions or other functions, such as transforming the format of the signals entering the system 10 (e.g., an optical to electrical converter or changing a signal from RZ to NRZ format), transforming a single stream of data into plural lower bit rate streams, etc. The interface 50 can be, for example, the receiver end of an optical short reach interface which receives and converts a high bit rate optical signal into two or more lower bit rate electrical signals. The conversion of a single, high bit rate signal into two or more lower bit rate signals is advantageous, for example, when a high bit rate signal can be processed more efficiently in several lower bit rate streams.

The Manchester encoder 52 encodes incoming data signals with a Manchester encoding scheme. The encoder 52 can be implemented, for example, as an integrated circuit, such as an application specific integrated circuit, a general purpose integrated circuit, a field programmable gate array, or other integrated circuits.

The Manchester encoding scheme typically encodes each bit of data as a two part bit code, with the first part of the bit code being the complement of the data, and the second part being the actual data. Other variations of Manchester encoding, such as where the second part of the bit code is the complement of the data, can also be used with the present invention. Furthermore, although the present invention will be described in terms of Manchester encoding, the present invention is applicable to other encoding schemes, including the modulation of data onto an electrical carrier, which reduce or transform the DC component of data signals and, thereby, provide for signal upconversion in accordance with the present invention. In some embodiments, the transmitter 20 can upconvert data onto one or more sidebands, or it can transmit data at the optical carrier wavelength $\lambda_o$. For example, the Manchester encoder 52 can be activated for upconversion and deactivated, so that data signals pass through unencoded, for transmission at the optical carrier wavelength $\lambda_o$. In other embodiments, the transmitter 20 can include a bypass circuit around the Manchester encoder 52 for transmission at the optical carrier wavelength $\lambda_o$.

The optical carrier source 54 provides an optical carrier having a center carrier wavelength $\lambda_o$, such as a continuous wave optical carrier, to the E/O converter 56. The optical carrier source 54 can include control circuits (not shown), such as drive and thermal control circuits, to control the operation of the optical carrier source 54.

The E/O converter 56 receives the optical carrier $\lambda_O$ from the optical carrier source 54 and receives electrical data signals at data input 58. The E/O converter 56 converts the electrical data signals into optical data signals $\Lambda_o$. The E/O converter 56 can provide the data on one or more sidebands of the optical carrier $\lambda_O$, which is sometimes referred to as "upconversion" or "subcarrier modulation". The E/O converter 56 can include, for example, one or more Mach-Zehnder interferometers, other interferometers, or other E/O converters.

Figure 4:
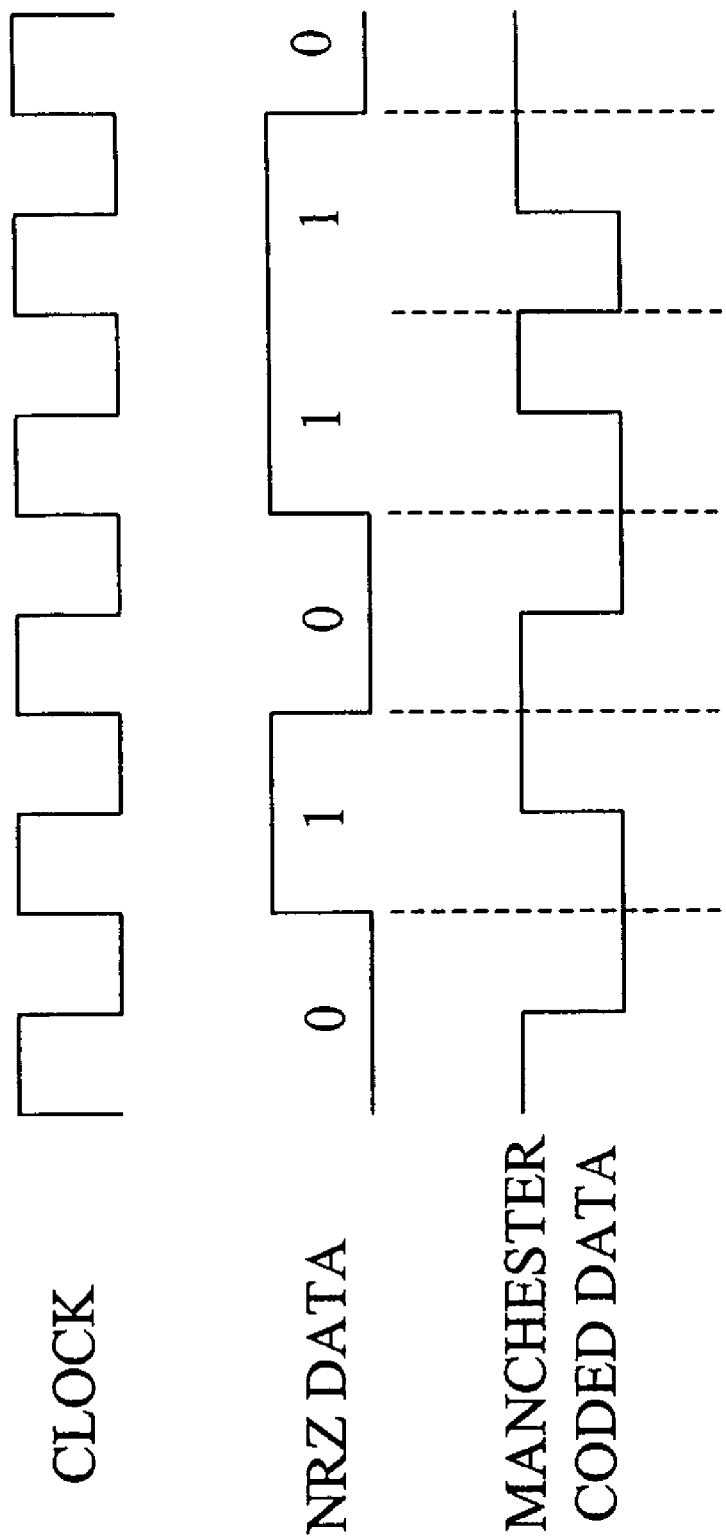
FIG. 4 shows timing diagrams illustrating one example of Manchester encoding.

FIG. 4 shows an example of Manchester encoded data, along with corresponding NRZ data and a clock signal. In that example the Manchester encoded data corresponds with data in NRZ format, although many forms of data can be Manchester encoded, including data in RZ format. In this example, the Manchester encoded data includes a two part bit code, with the first part of the bit code being the complement of the data, the second part being the actual data, and with a transition between the two parts. Other variations of Manchester encoding can also be used with the present invention. One form of Manchester encoding is specified in IEEE Standard 802.3. Other forms and variations of Manchester encoding also exist and are applicable to the present invention.

Figure 5:
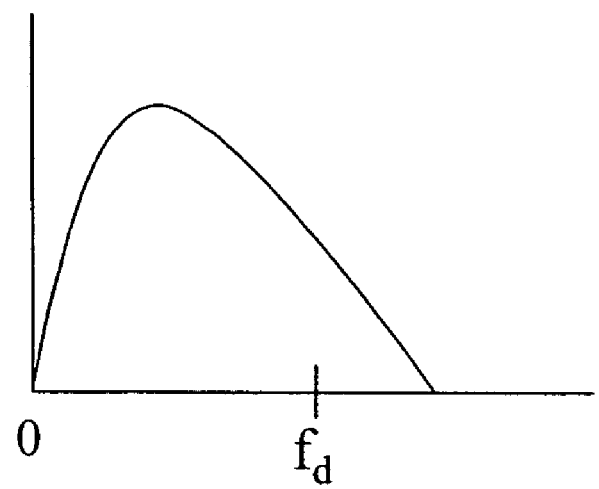
FIG. 5 shows one example of a frequency spectrum for a Manchester encoded signal.

FIG. 5 shows an example of Manchester encoded data in the frequency spectrum. Manchester encoded data typically has an asymmetrical frequency spectrum about data rate frequency $f_d$. Furthermore, the data rate frequency $f_d$ of the data signal affects the frequency spectrum of the Manchester encoded data, so that the greater the data rate $f_d$, the greater the spread of the frequency spectrum of the Manchester encoded signal. Because each bit of a Manchester encoded signal has a transition between states, Manchester encoded data has a frequency component equal to the bit rate. As a result, the electrical data signals are upconverted onto one or more sidebands of the optical carrier $\lambda_o$ at the electrical to optical converter 56. Furthermore, the frequency spectrum of the Manchester encoded signal will affect the shape and offset of the sidebands.

Figure 6:
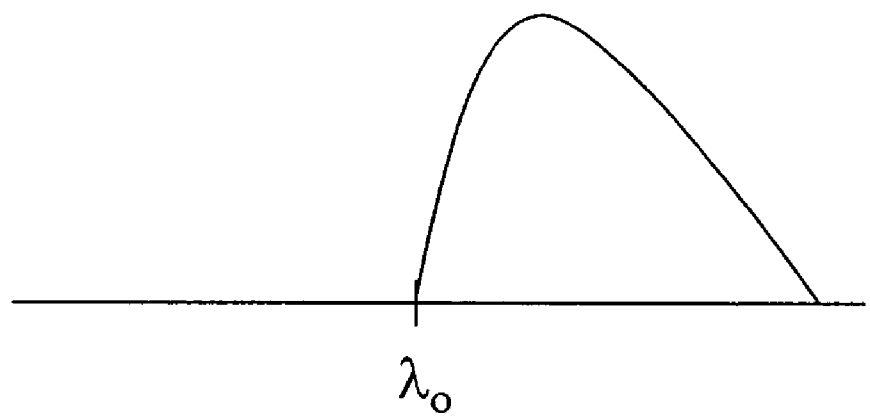
FIG. 6 shows one example of a frequency spectrum for an upconverted optical signal generated from the Manchester encoded signal of FIG. 5.

FIG. 6 shows a signal profile of the optical data signal $\Lambda_o$ when the Manchester encoded data signal of FIG. 5 is input to the E/O converter 56. In that example, the Manchester encoded data signal is upconverted onto a single sideband of the optical carrier $\lambda_o$ and the optical carrier $\lambda_o$ is suppressed. The present invention can also be used with other upconversion formats. For example, the carrier does not have to be suppressed, and the Manchester encoded data signals can be upconverted in other formats, such as double sideband signals.

Figure 7:
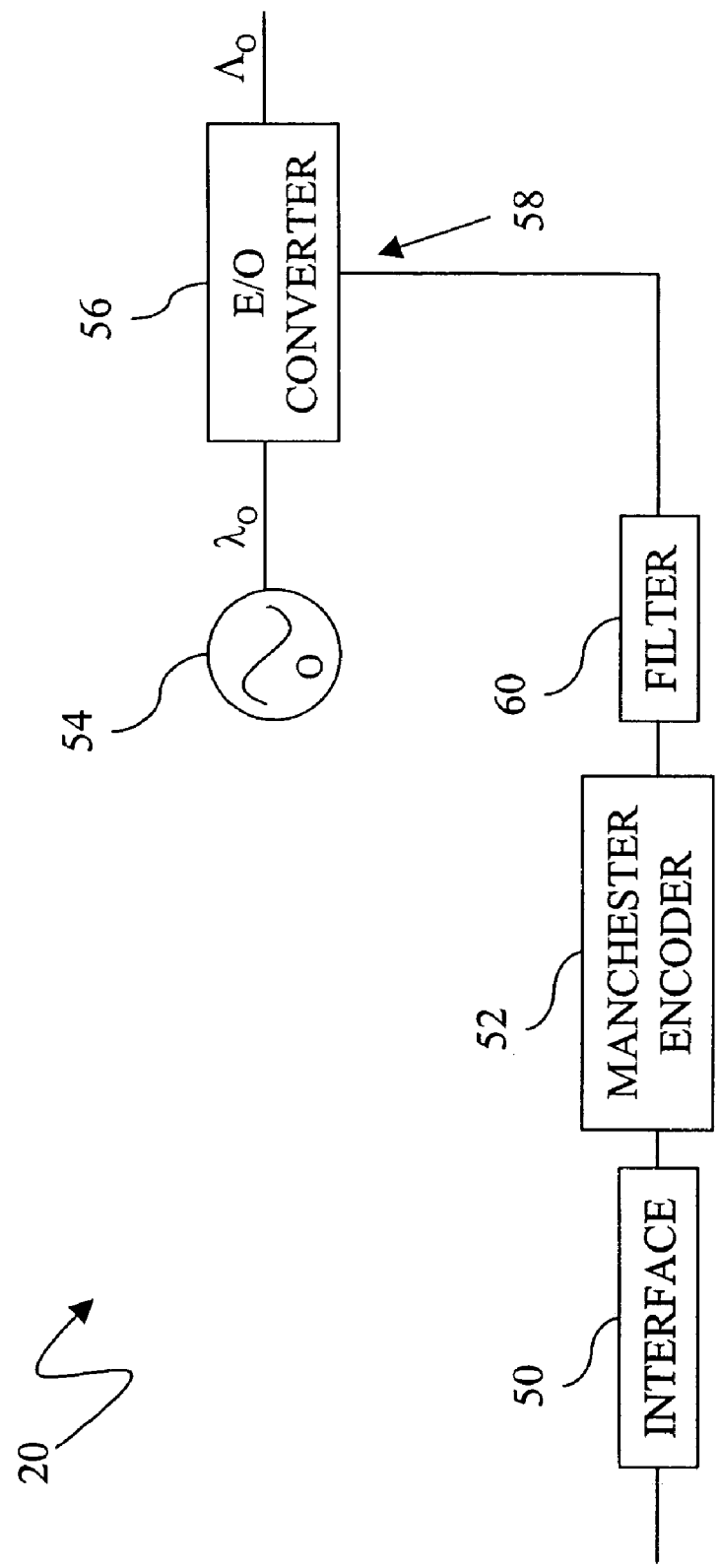
FIG. 7 shows another embodiment of the transmitter including a filter.

FIG. 7 shows another embodiment of the transmitter 20 including a filter 60 for the Manchester encoded signal spectrum. The filtered Manchester encoded signal allows for better performance by, for example, providing a filtered Manchester encoded signal having a frequency spectrum which is more symmetrical about the data rate frequency $f_d$ and more narrow, thereby requiring less bandwidth to transmit the same information. In some embodiments, the filter 60 may be omitted, such as when using a narrow band E/O converter 56 (e.g., a resonantly-enhanced modulator). The filter 60 may also be used to narrow the frequency spectrum in conjunction with other devices, such as differential encoders 69 described hereinbelow, to facilitate other functions, such as to facilitate duobinary encoding.

Figure 8:
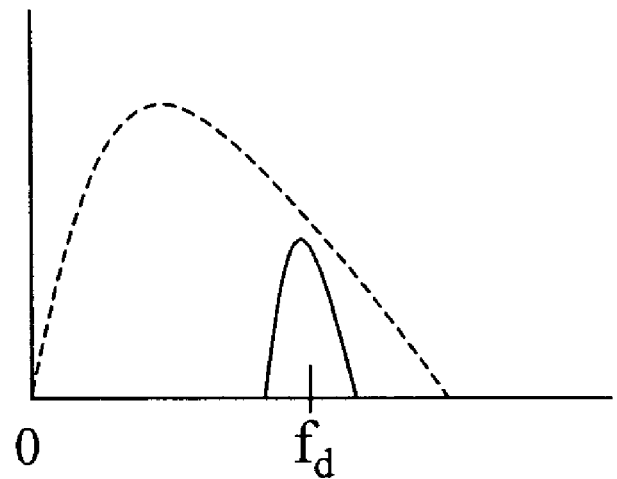
FIG. 8 shows one example of a frequency spectrum for a filtered Manchester encoded signal.

FIG. 8 shows a frequency spectrum for one example of the filtered Manchester encoded signal, with the unfiltered signal shown as a broken line.

Figure 9:
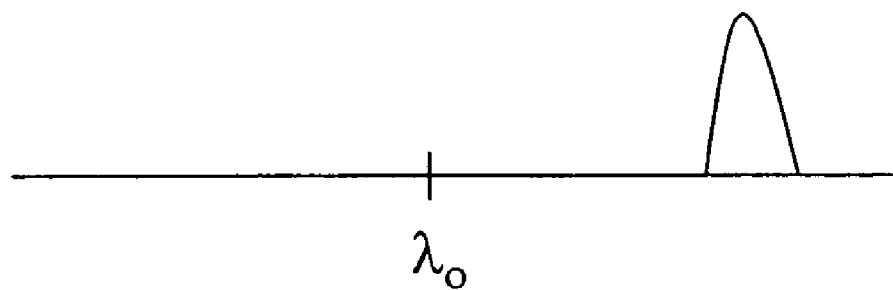
FIG. 9 shows one example of a frequency spectrum for an upconverted optical signal generated from the Manchester encoded signal of FIG. 8.

FIG. 9 shows a signal profile of the optical data signal $\Lambda_o$ when the Manchester encoded data signal of FIG. 8 is input to the E/O converter 56. In that example, the sideband signal is more compact and, therefore, uses less bandwidth than the sideband generated from unfiltered Manchester encoded signals, thereby allowing for increased system performance.

Figure 10:
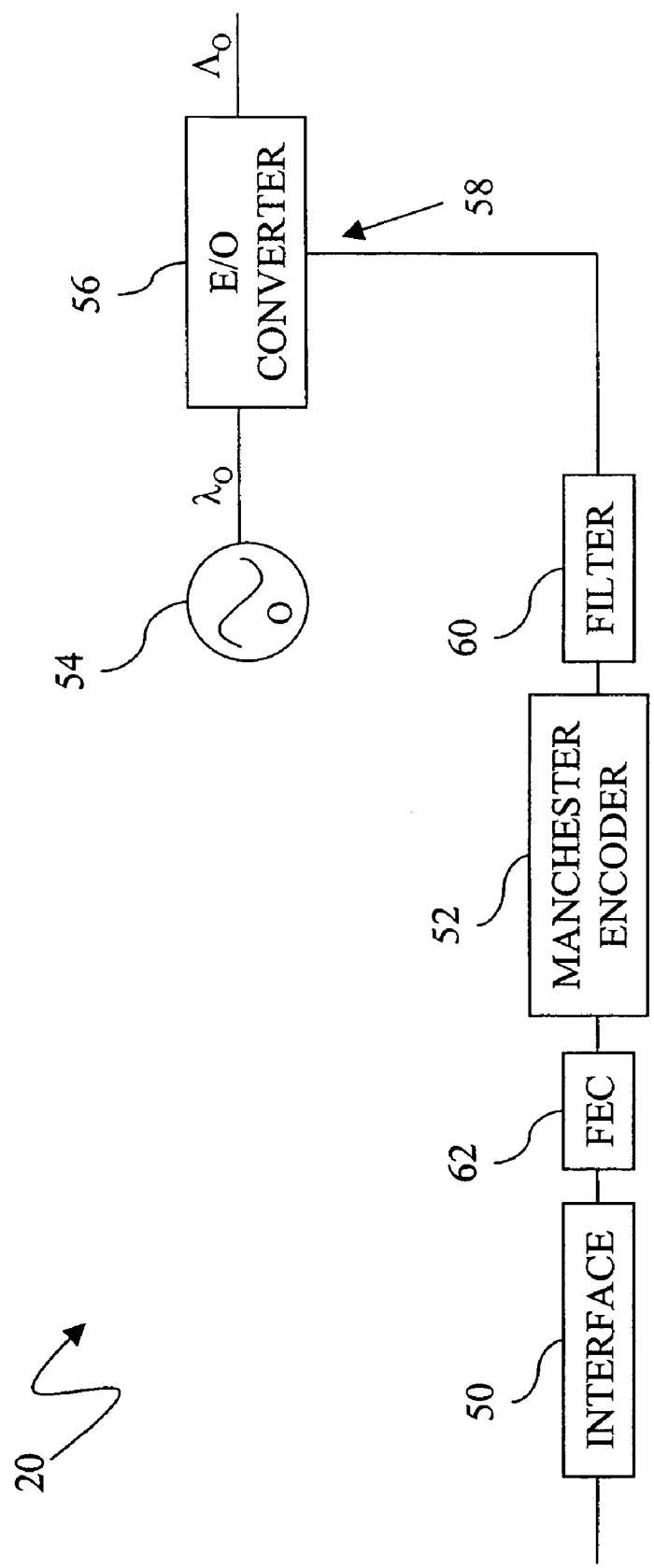
FIGS. 10 and 11 show additional embodiments of the transmitter.

FIG. 10 shows another embodiment of the transmitter 20 which includes a forward error correction ("FEC") encoder 62. The FEC encoder 62 can utilize, for example, a G.975 compliant (255,239) Reed-Solomon code, or another FEC code or coding scheme. The FEC encoder 62 will add non-information carrying and/or redundant data, sometimes referred to as "overhead", to the signal, thereby changing the bit rate and frequency spectrum of the Manchester encoded signal. A change in the bit rate and frequency spectrum of the Manchester encoded signals can change the location and frequency spectrum of the sidebands relative to the optical carrier $\lambda_o$. The amount of overhead added by the FEC encoder 62 will vary depending on the amount of FEC encoding performed on the data signals.

Figure 11:
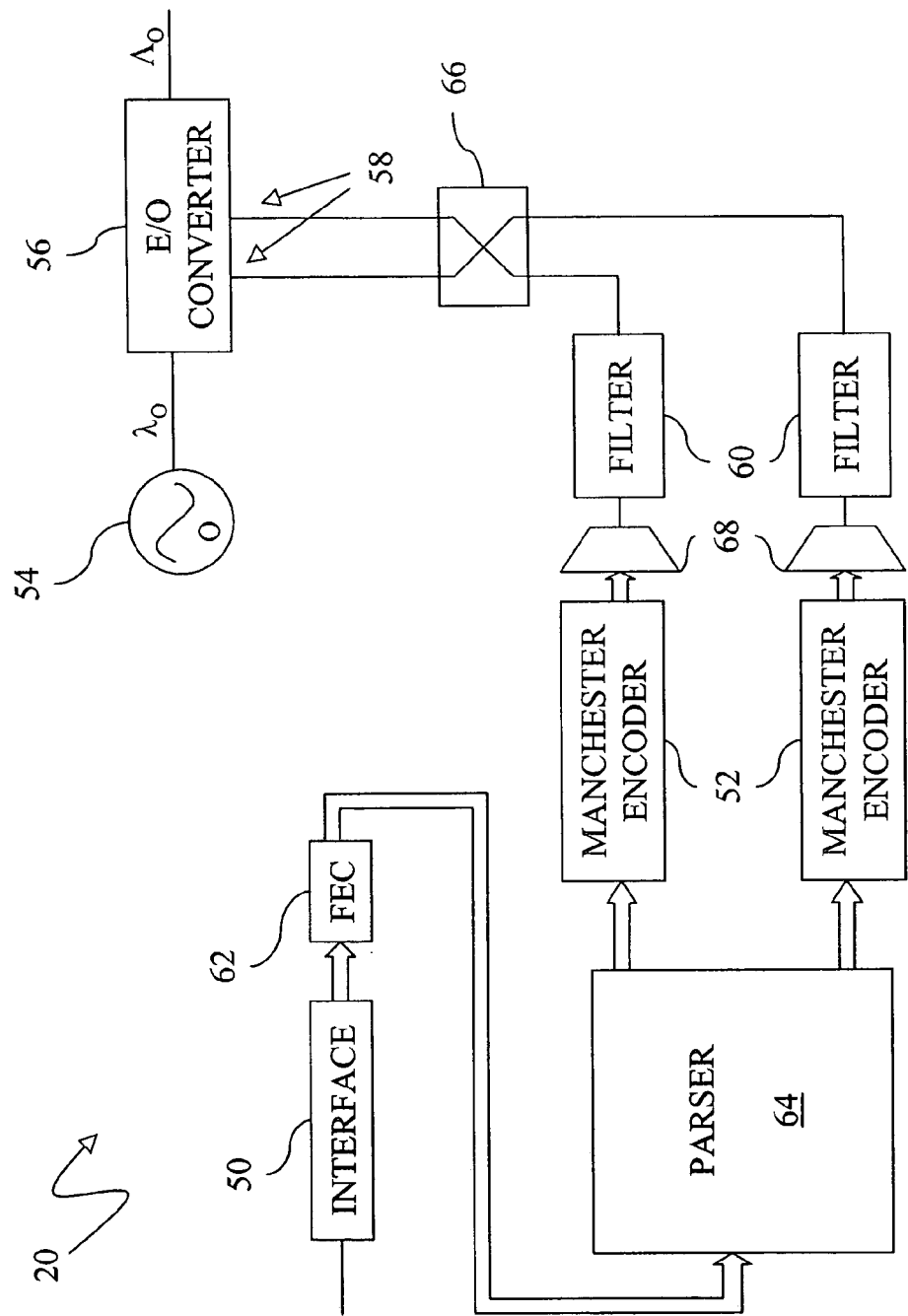

FIG. 11 shows another embodiment of the transmitter 20 including a parser 64 and a coupler 66. In that embodiment the parser 64 separates the data signal into two signals which are coupled before entering the E/O converter 56 such that the signals are upconverted onto separate sidebands of the optical carrier $\lambda_o$. The transmitter 20 can be used, for example, to transmit a high bit rate signal as two or more lower bit rate signals. Such a transmitter 20 is advantageous, for example, if a high bit rate signal is provided to a transmitter 20 but desired system performance, such as transmission distance, OSNR, etc., is not practical or cost effective with the higher bit rate signal. In that situation, the higher bit rate signal can be separated into two or more lower bit rate signals which can be recombined or assembled at the receiver 22.

The parser 64 in the illustrated embodiment separates the data signal into two data signals. In other embodiments of the transmitter 20, the parser 64 can separate the data signal into more than two data signals. The parser 64 can also utilize other parsing schemes, such as separating the data signal into two or more data signals having the same or different bit rates. The parser 64 can also separate the data signal at every bit, at every byte, at every several bits or bytes, or in other intervals, whether uniform or non-uniform. For example, the number of bits or bytes can vary with time or with some other function, such as a parameter of the data signal. Furthermore, the parser 64 can utilize redundancy in the data streams, such that some data is provided on more than one data stream, or no redundancy at all can be used. The parser 64 can include those and other variations and combinations of parsing schemes. In one example, the parser 64 separates a data stream onto two, lower bit rate data streams, and parses the data stream at each bit, sending one bit on one data stream, sending the next bit on the other data stream, and then repeating.

Figure 12:
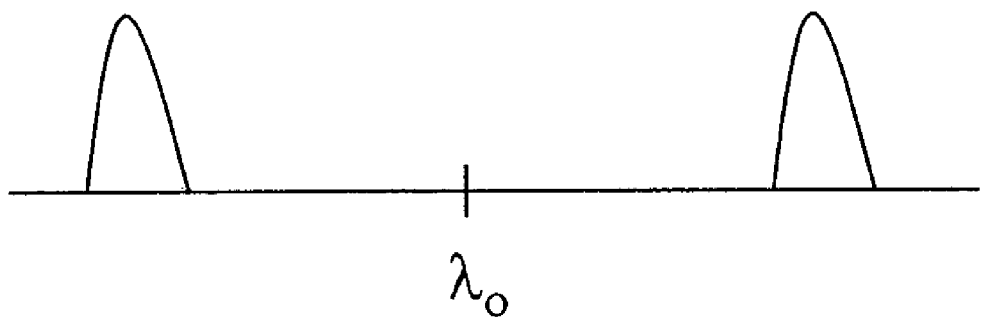
FIGS. 12 and 13 show other examples of frequency spectrums for upconverted optical signals

The coupler 66 in the illustrated embodiment is a two-by-two, ninety degree electrical coupler, such that the first output produces a signal similar to the signal at the second input plus a ninety degree phase shifted form of the signal at the first input, and the second output produces a signal similar to the signal at the first input plus a ninety degree phase shifted form of the signal at the second input. The coupler 66 couples and phase shifts the parsed data signals so that, for example, when each output of the coupler 66 is used to modulate an arm of a double parallel Mach-Zehnder interferometer or a similar device, each of the parsed signals will be upconverted onto a separate optical sideband, as shown in FIG. 12. Other variations of the electrical coupler 66 are also possible. For example, the coupler 66 can have different numbers of inputs and outputs, can induce different phase shifts, and can equally or unequally split and couple the signals to produce different kinds of optical signals.

Also in that embodiment, the interface 50 demultiplexes or "deserializes" the incoming data signal into several lower bit rate signals, which are provided by the interface 50 in parallel. Such deserializing of a signal can facilitate processing the signal, such as for FEC encoding and parsing. For example, in some circumstances it is more practical to perform parallel processing on two or more lower bit rate signals than it is to perform the same operation on a single, high bit rate signal. Some, none, or all of the data processing in the transmitter 20 can be performed with several parallel, lower bit rate signals. Multiplexers 68, sometimes referred to as "serializers", are also included in that embodiment to combine parallel data signals into a higher bit rate serial data signals.

FIG. 12 shows a signal profile of the optical data signal $\Lambda_o$ when the parsed and coupled data signals of FIG. 11 are input to the E/O converter 56. In that embodiment, one of the data signals is upconverted to a data signal at a longer wavelength than the optical carrier $\lambda_o$, the other sideband is upconverted to a sideband at a shorter wavelength than the optical carrier $\lambda_o$, and the optical carrier $\lambda_o$ is suppressed.

Figure 13:
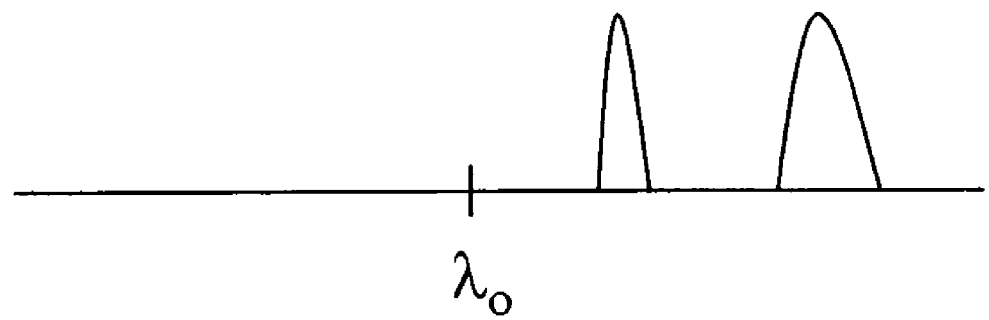

FIG. 13 shows another signal profile of the optical data signal $\Lambda_o$. That signal profile can be produced by an embodiment of the transmitter 20 in which the parser 64 separates the data signal into signals having different bit rates and, therefore, different frequencies. As a result, the different data signals will be offset differently from the optical carrier $\lambda_o$. Typically, the lower bit rate signal will also have more narrow frequency and wavelength spectrums. In other embodiments, the optical data signals can be on opposite sides of the optical carrier $\lambda_o$, and in other embodiments there can be more than two parsed data signals having more than two different bit rates.

Figure 14:
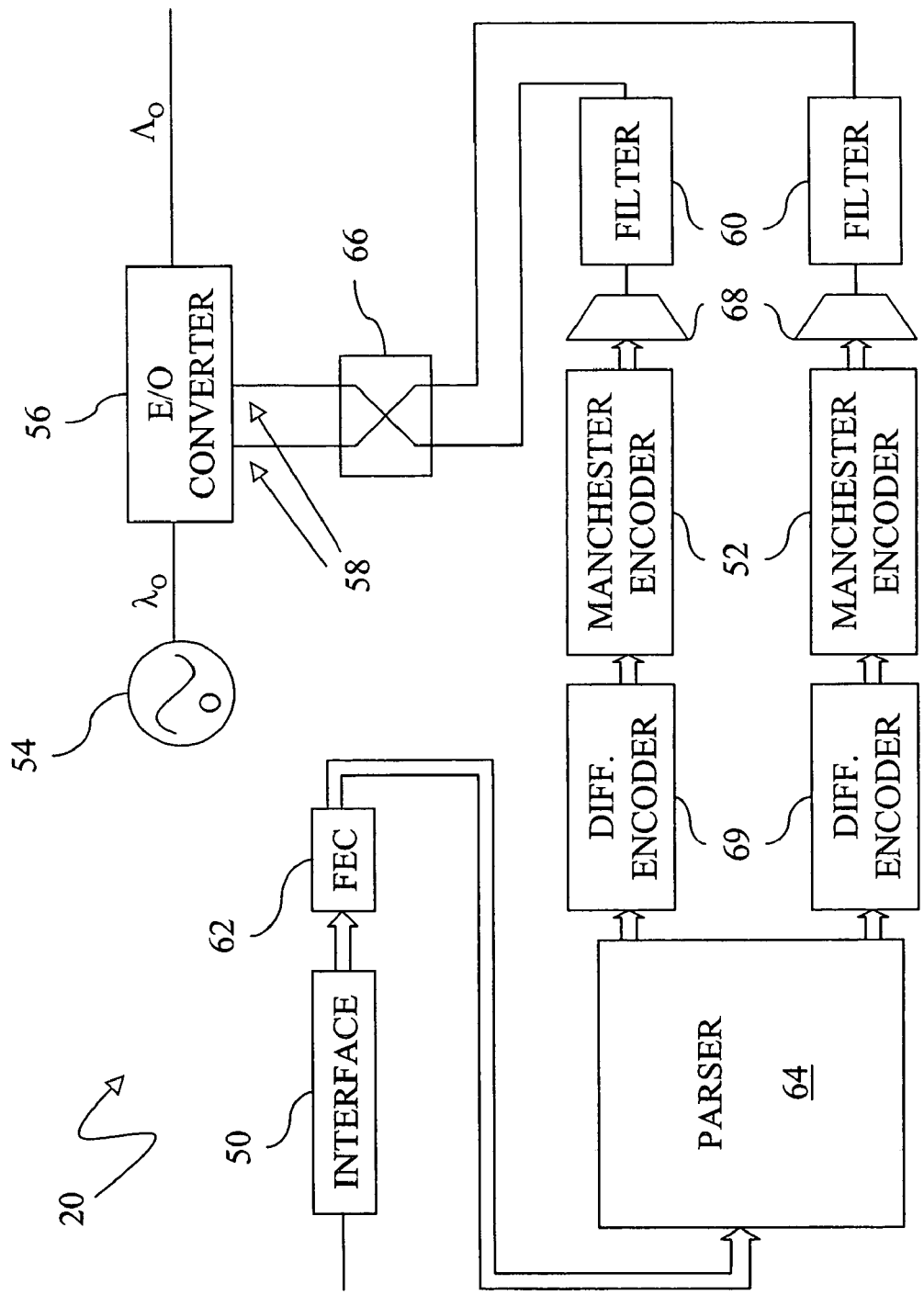
FIGS. 14 and 15 show other embodiments of the transmitter.

FIG. 14 shows another embodiment of the transmitter 20 including differential encoders 69. The parser 64, differential encoders 69, and Manchester encoders 52 can be implemented, for example, as one or more field programmable gate arrays, application specific integrated circuits, general purpose integrated circuits, or other integrated circuits. Furthermore, the differential encoders 69, as well as other devices, may be implemented in other embodiments of the invention, such as embodiments without the parser 64. Furthermore, the differential encoder may be replaced with other encoders, such as duobinary encoders.

Figure 15:
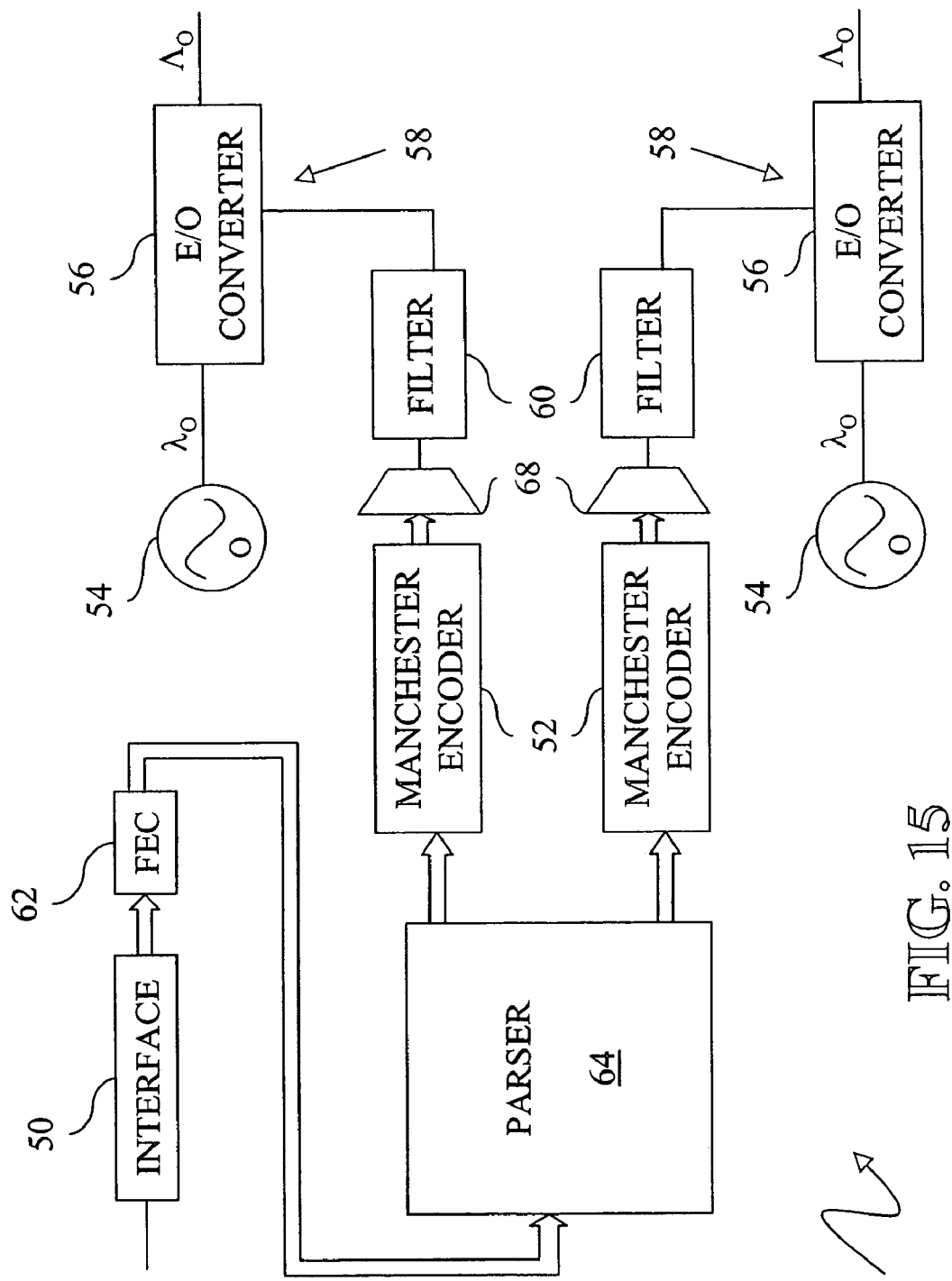

FIG. 15 shows another embodiment of the transmitter 20 in which the parser 64 is used and the coupler 66 is eliminated. In that embodiment, an optical carrier source 54 and an E/O converter 56 are provided for each parsed signal. For example, both parsed data signals can be provided at the same bit rate, but optical carriers $\lambda_o$ having different wavelengths can be used so that the data signals are upconverted onto different frequencies. In other embodiments, the optical carrier sources 54 can produce optical carriers $\lambda_o$ having the same wavelength and, for example, one parsed data signal can be upconverted onto a sideband having a longer wavelength than the optical carrier $\lambda_o$, and the other parsed data signal can be upconverted onto a sideband having a shorter wavelength than the optical carrier $\lambda_o$. In other embodiments, the parser 64 can separate the data signal into more than two signals, and more than two optical carrier sources 54 and an E/O converters 56 can also be used.

Figure 16:
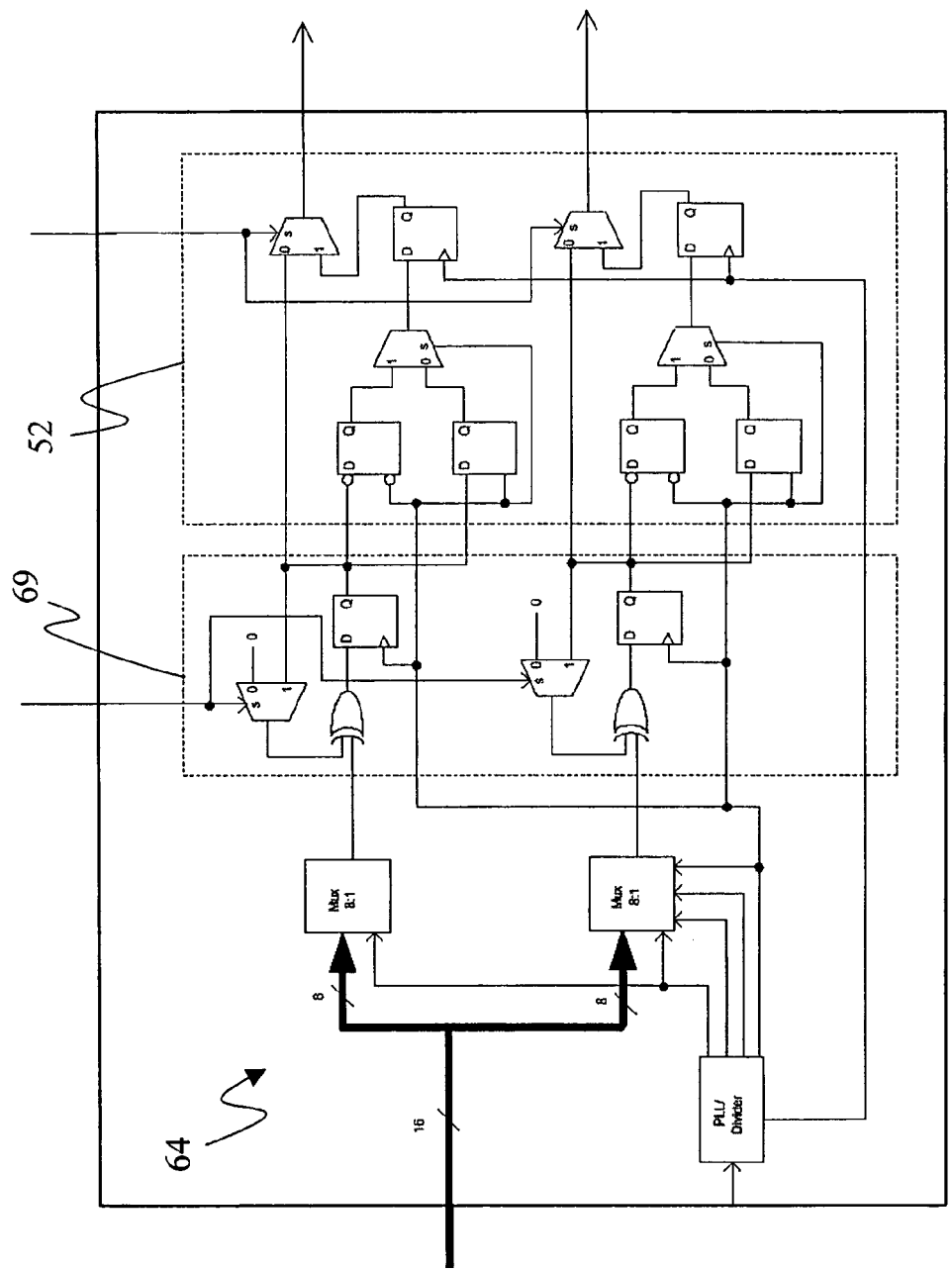
FIG. 16 shows a circuit schematic of one embodiment of the parser, Manchester encoders, and differential encoders.

FIG. 16 shows a circuit schematic of one embodiment of the parser 64, differential encoders 69, and Manchester encoders 52. That embodiment can be, for example, in the form of an integrated circuit, such as an application specific integrated circuit, a field programmable gate array, a general purpose integrated circuit, other integrated circuits, or discrete components.

Figure 17:
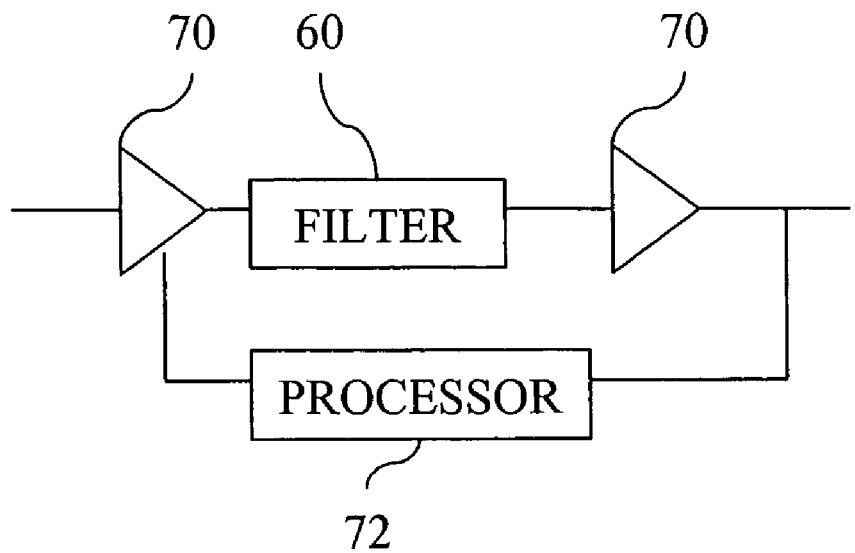
FIG. 17 shows another embodiment of the filter portion of the transmitter.

FIG. 17 shows another embodiment of a portion of the transmitter 20 around the filter 60. That embodiment includes a first amplifier 70 in front of the filter 60, a second amplifier 70 after the filter 60, and a feedback loop including a processor 72. The first amplifier 70 and the feedback loop provide controlled signal gain to compensate for variations in the data signal. For example, one or more parameters (e.g., gain and gain profile) of the first amplifier 70 can be controlled through the feedback loop, which can include the processor 72 and/or other circuitry, such as an application specific integrated circuit, a general purpose integrated circuit, a field programmable gate array, and discrete components, to process the feedback signal and control the first amplifier 70. The second amplifier 70 provides additional gain, and it can be eliminated if sufficient gain is provided by the first amplifier 70. This embodiment can be modified, such as to utilize a feedforward loop, to utilize more or less amplifiers 70, to vary the location of the amplifiers 70, etc.

Figure 24:
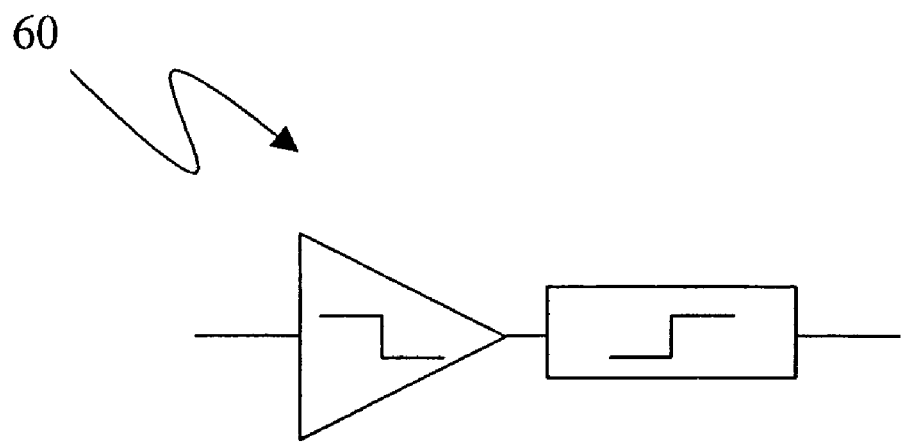
FIG. 24 shows another embodiment of the filter portion of the transmitter.

FIG. 24 illustrates one embodiment of the filter 60. In that embodiment, the filter 60 includes a low pass stage and a high pass stage which collectively act as a band pass filter. The low pass stage is illustrated as an amplifier, such as a gain limiting amplifier, and the high pass stage is illustrated as a passive filter, such as a passive Bessel filter, although other types of amplifiers, filters, or other devices may be used, and the filter may include active or passive stages. In some embodiments, the order in which the stages are arranged and the number of stages may be changed. In other embodiments, one or more of the amplifiers 70 illustrated in FIG. 17 may operate as one or more of the filter stages, such as the gain limiting amplifier. In other embodiments, the filter 60 may be a filter other than a band pass filter. The filter 60 may be used, for example, to facilitate duobinary encoding by selecting filter characteristics which compliment the differential encoder 69 or other devices.

Figure 18:
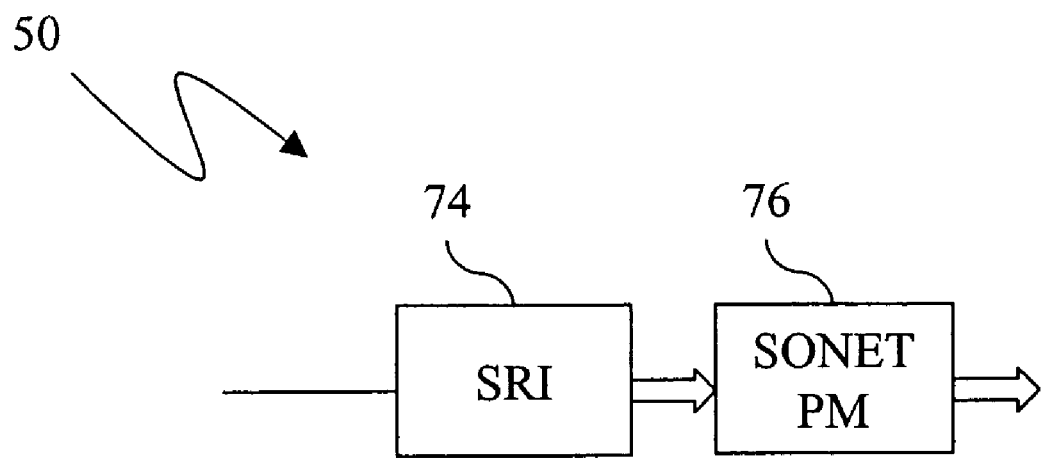
FIG. 18 shows one embodiment of the transmitter interface.

FIG. 18 shows an embodiment of the transmitter interface 50 including a short reach interface ("SRI") receiver 74 and a SONET performance monitor 76. In the illustrated embodiment, the SRI 74 converts the incoming data signal into two or more parallel, lower bit rate signals. For example, the SRI can convert an optical OC-192 signal into sixteen parallel, 622 Mbps electrical signals. The SONET performance monitor 76, for example, can perform section monitoring and termination functions.

Figure 19:
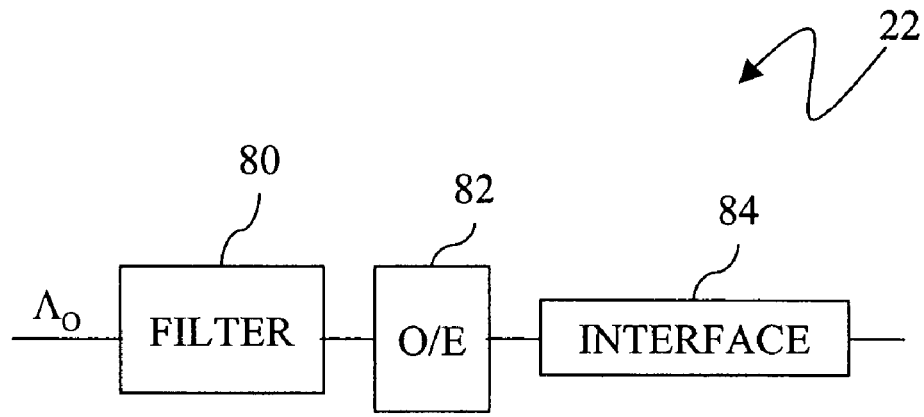
FIGS. 19-22 shows several embodiments of a receiver.

FIG. 19 shows a receiver 22 including a filter 80, an optical to electrical ("O/E") converter 82, and an interface 84. That receiver 22 can receive the optical data signals generated by the transmitters 20 of the present invention without the need for Manchester, differential, or duobinary decoders. The receiver 22 can also include other features, such as FEC decoding, assembling two or more data signals, automatic gain control ("AGC"), clock and data recovery ("CDR"), deserializing, etc.

The filter 80 filters one or more signals from the incoming optical data signal $\Lambda_o$. For example, in a WDM system 10 the filter can be used to select among the several signals and to reduce the noise in the optical data signal $\Lambda_o$, while in a single channel system 10 the filter 80 can be used to filter noise. In some embodiments, such as single channel systems where noise is not of concern, the filter 80 can be eliminated. The filter 80 can be a single stage or multiple stage filter, can be a single pass or a multiple pass filter, and can utilize one or more types of filters. For example, the filter 80 can have one stage including one or more fiber Bragg gratings and another stage including one or more Mach-Zehnder interferometric filters. The filter 80 can also include other types of filters, such as a fiber Bragg Fabry-Perot filter, a notched filter, a phase shifted filter, a bulk grating, etc., and can, for example, provide one or more filtered signals to one or more receivers 22. Many other types and combinations of filters 80 are also possible.

The O/E converter 82 converts the optical data signal $\Lambda_o$ into one or more corresponding electrical signals. The interface 84 provides a connection for data being received and is analogous to the interface 50 in the transmitter 20.

Figure 20:
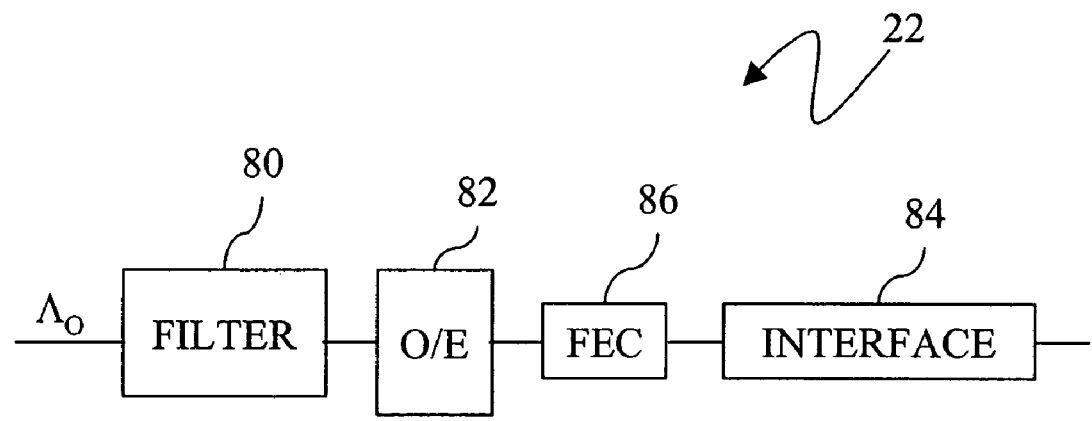

FIG. 20 shows another embodiment of the receiver 22 including a FEC decoder 86. That receiver 22 can be used to receive data signals which are FEC encoded, such as can be transmitted by the transmitter 20 illustrated in FIG. 10.

Figure 21:
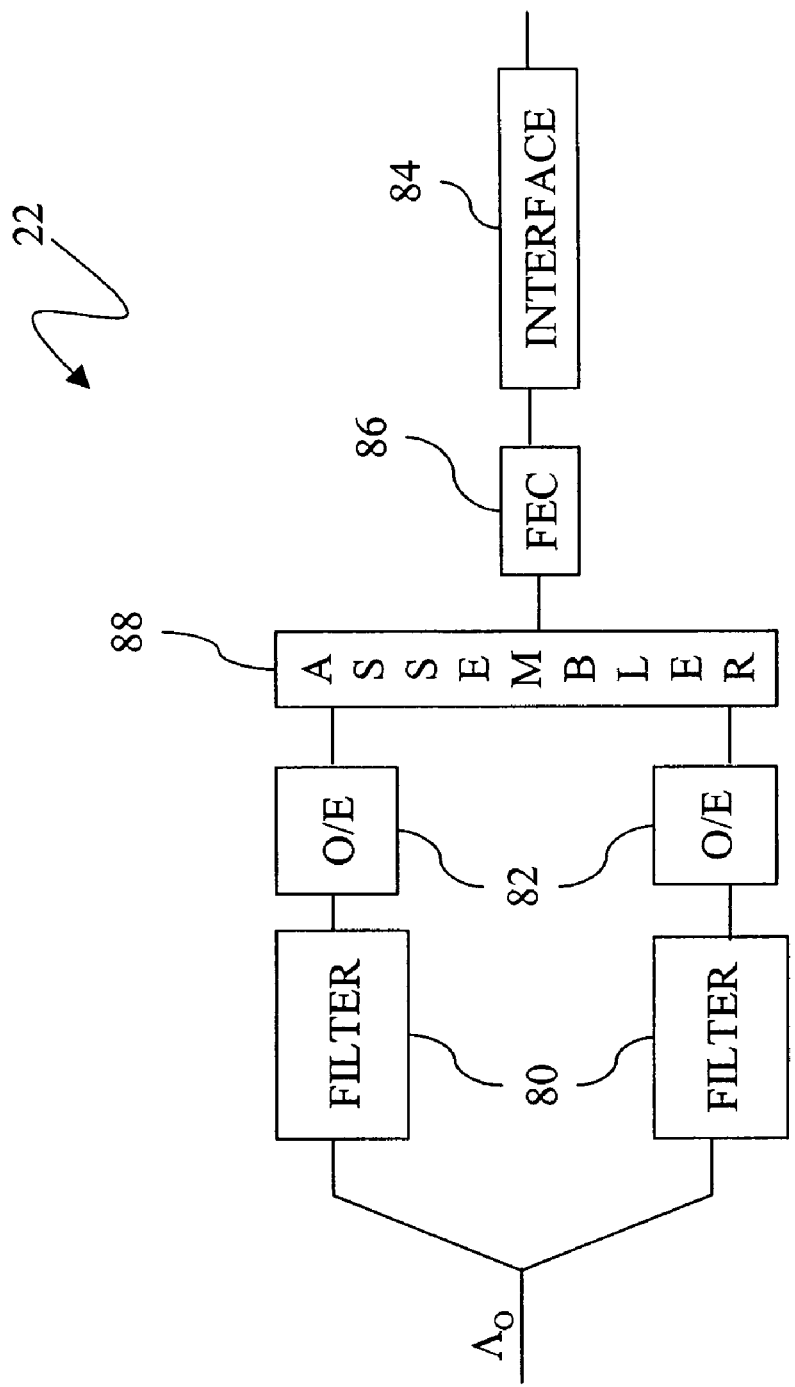

FIG. 21 shows another embodiment of the receiver 22 including an assembler 88 that can be used to receive separated data signals, such as those transmitted by the transmitter 20 illustrated in FIG. 11. In that embodiment, the received optical signal is split between two filters 80, each of which filters one of the signals to be received. In other embodiments, the separate filters 80 can be replaced by a single filter (e.g. a bulk grating or an arrayed waveguide) which can separate from the incoming signal $\Lambda_o$ the two or more data signals of interest. The filtered signals are converted to electrical form by the O/E converters 82, and the electrical signals are combined by the assembler 88. In other embodiments, more than two signals can be assembled. The illustrated embodiment also includes a FEC decoder 86 which decodes the forward error correction encoded signals.

Figure 22:
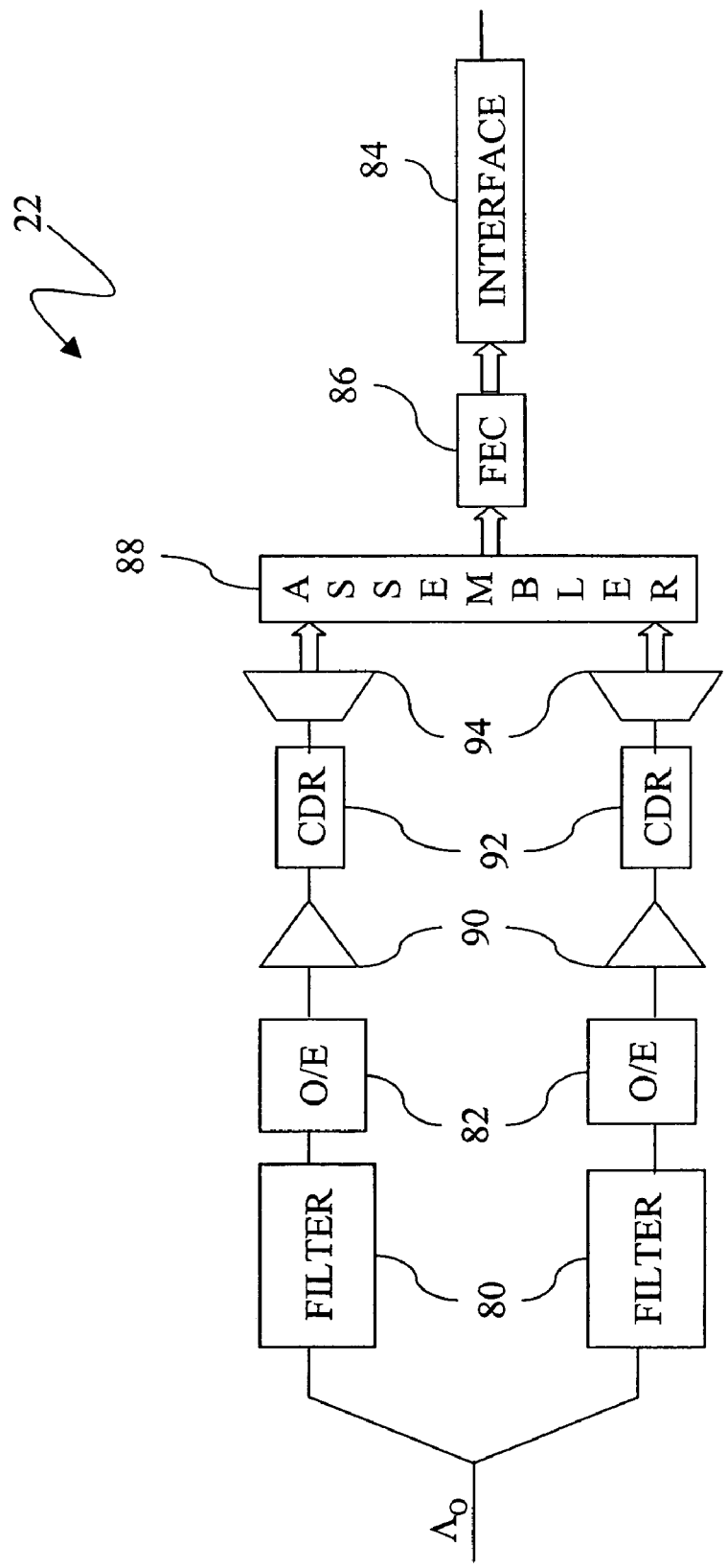

FIG. 22 shows another embodiment of the receiver 22 that includes automatic gain controllers ("AGC") 90, clock and data recovery ("CDR") circuits 92, and demultiplexers 94, which are sometimes referred to as "deserializers". The demultiplexers 94 separate a serial data signal into plural lower bit rate data signals, which are assembled by the assembler 88. The assembler 88 produces the assembled data as several separate data signals which are FEC decoded and combined into a single signal by the interface 84. The demultiplexing or deserializing of the data signal into several lower bit rate signals facilitates further processing of the signal, such as assembling and FEC decoding. For example, in some circumstances it is more practical to perform parallel processing on several lower bit rate signals than it is to perform the same operation on a single, high bit rate signal. Some or all of the data processing in the receiver 22 can be done with several parallel low bit rate signals.

Figure 23:
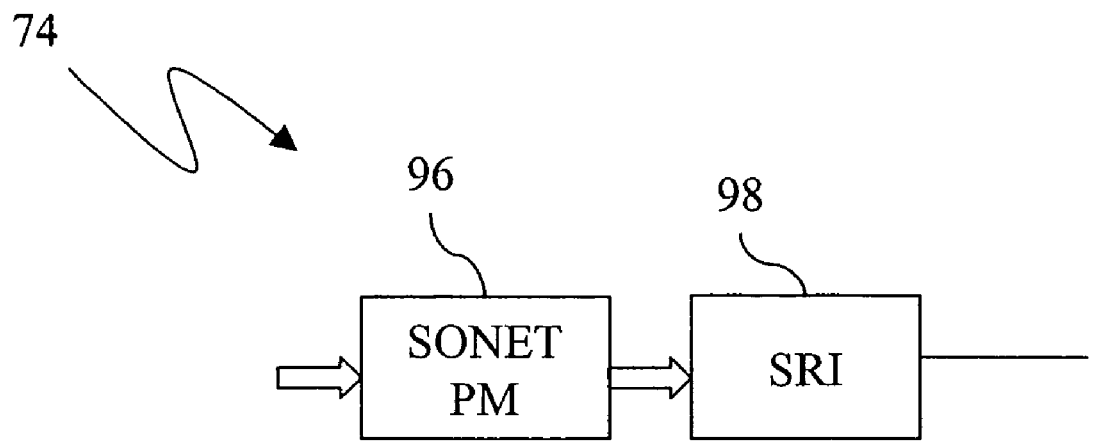
FIG. 23 shows one embodiment of the receiver interface.

FIG. 23 shows an embodiment of the receiver interface 74 including a SONET performance monitor 96 and a short reach interface ("SRI") transmitter 98. The SONET performance monitor 96, for example, can perform section monitoring and termination functions. The SRI 98 combines the parallel data signal into a higher bit rate, serial signal. The receiver interface 74 is analogous to the transmitter interface 50.

Figure 25:
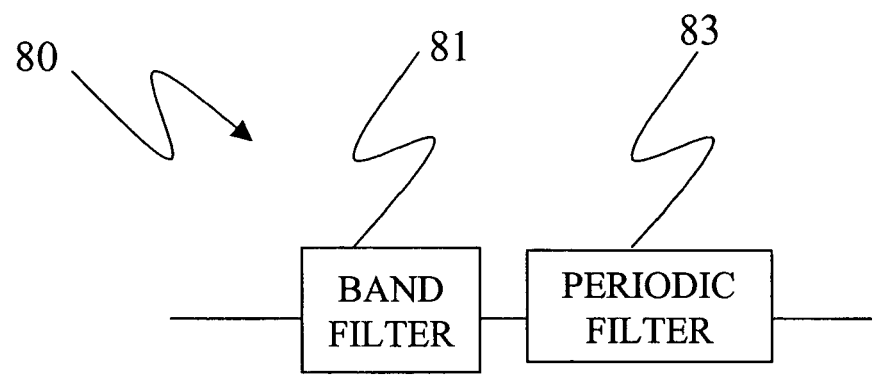

FIG. 25 illustrates one embodiment of a optical filter 80 which may be used, for example, in the receiver 22. In that embodiment, the optical filter 80 includes a band filter 81, such as a Bragg grating filter, followed by a periodic filter 83, such as a Mach-Zehnder filter. It will be appreciated that other types of periodic and band filters may be used and the band and periodic filters can include one or more stages in the optical filter 80.

In FIG. 25 embodiments, the band filter 81 can be used to filter one or more channels from a multiple channel signal. The periodic filter 83, in turn, can be used to filter and/or shape one of the signal channels filtered by the band filter 81. The output of the periodic filter is a single filtered, shaped optical signal channel that can be provide to a receiver 22, as described above, or to another optical system 10.

The multiple channel signal can be various types of multiple channel signals, such as a wavelength division multiplexed optical signal, a subcarrier multiplexed signal, etc. and combinations thereof. For example, the single filtered, shaped optical signal channel provided by the periodic filter could include multiple signals that are to be coherently detect by a coherent receiver.

In exemplary embodiments, the band filter 81 can be used to filter one channel from a multiple channel signal and the periodic filter 83 can be used to shape the band filtered signal. In these embodiments, the band filter 81 can have a bandwidth ranging from on the order of the channel bandwidth to the bandwidth separating adjacent channels in the wavelength spectrum. The bandwidth of the band filter 81 will dictate the relative contributions of the signal channel and noise to the band filtered signal.

Figure 26:
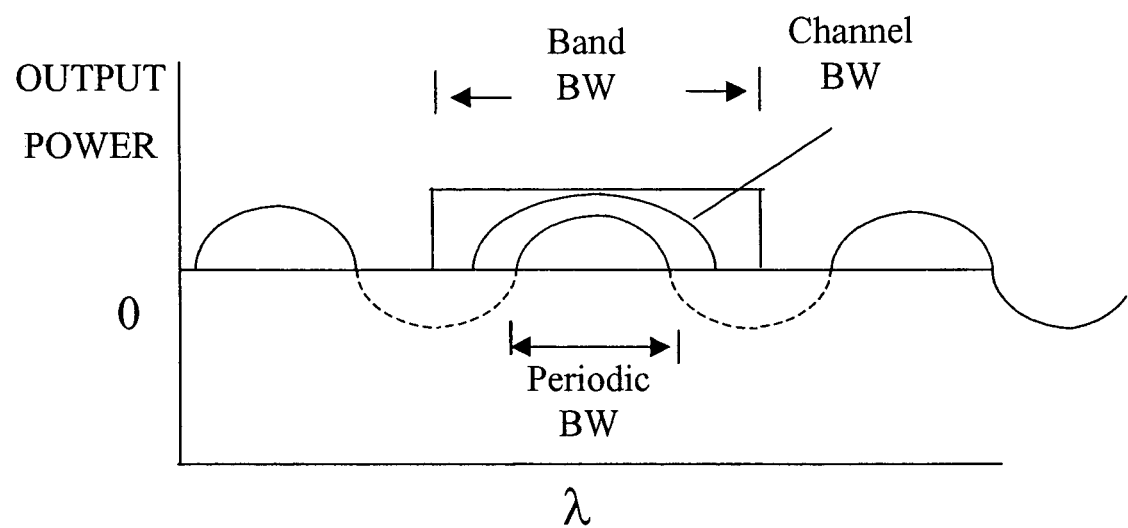
FIGS. 25-30 show several optical filter embodiments.

FIG. 26 provides a schematic representation of the output power and filter bandwidth (bw) from the band filter 81 and the periodic filter 83 as a function of wavelength λ. The bandwidth of the periodic filter 83 is designed to be on the order of the nominal, or expected, signal channel bandwidth when it reaches the filter 80. Generally, the periodic bandwidth will be larger than the expected signal channel bandwidth; however it can be smaller. Also, the periodic filter 83 generally will have a periodic filter bandwidth that is less than the band filter bandwidth. However, the bandwidth of the periodic filter 83 can be greater than the band filter 81 bandwidth in embodiments where the filter is being used to shape, but not narrow, the band filtered signal.

In various embodiments, the band filter 81 bandwidth can be sufficiently larger (e.g., 2×) than the nominal bandwidth of the signal channel, such that fine precision control scheme will not be required to maintain alignment between the band filter 81 bandwidth and the signal channel bandwidth. The periodic filter 83 can have a periodic bandwidth on the order of the nominal channel bandwidth. As such, the periodic filter 83 would filter the signal channel from much of the noise that was included in the band filtered signal. The use of the periodic filter 83 following the band filter eliminates the need for a band filter that is precisely controlled to align with the signal channel spectrum, and the periodic filter 83 can be used anywhere in the spectral range of the periodic filter 83.

Alternatively, the band filter 81 can filter two channels from the multiple channel signal and one or more periodic filters 83 can filter and/or shape one or both channels. Examples of such embodiments will be described further below.

The band filter 81 and the periodic filter 83 can be controlled in various ways as is known in the art. For example, the band filters 81 can be designed in a within a spectral range and the band and periodic filters 83 can be controlled based on the optical power output from the filters. Alternatively, a channel identifier and/or tone can be imparted onto the channel or onto a wavelength proximate the channel, which could be used to control the filters. See, for example, U.S. patent application Ser. No. 09/588,527 filed Jun. 6, 2000, which is incorporated herein by reference. Various control circuits can be employed to stabilize and track the optical signal, as well as tune any tunable filters, such as those described hereinafter. See, for example, U.S. Pat. No. 5,467,212 which is incorporated herein by reference.

In various embodiments, a tunable band filter 81 can be used in combination with the periodic filter 83. The tunable band filter 81 provides tunable selection of one or more channels from a multiple channel signal. When used in combination with the periodic filter 83, the tunable band filter 81 allows the use of a common filter structure for multiple channels in a multiple channel system within the wavelength spectrum of the periodic filter 83.

In various embodiments, the tunable band filter 81 preferably would be tunable over the entire wavelength spectrum used in the system. Alternatively, multiple tunable band filters 81, each tunable over a part of the spectrum, can be used to provide coverage over the entire spectrum. Generally, the tunable band filter 81 will have a bandwidth that is larger than the periodic filter 83 to lessen the design requirements placed on the band filter 81. The periodic filter 83 generally provides narrow band periodic filtering over the entire spectrum in the system 10. The tunable band filter 81 can include one or more types of band filter, such as those previously described, such as fiber Bragg gratings, Fabry-Perot filters, thin film filters, etc.

The periodic filter 83 can be various types of filters, such Mach-Zehnder, Michelson interferometers, arrayed waveguides, etc. such as described above. For example, single and/or double Mach-Zehnder filters that include one or more stages such as those described in U.S. patent application Ser. No. 09/923,909 filed Aug. 7, 2001, which is incorporated herein by reference, can be used in the present invention.

Figure 27:
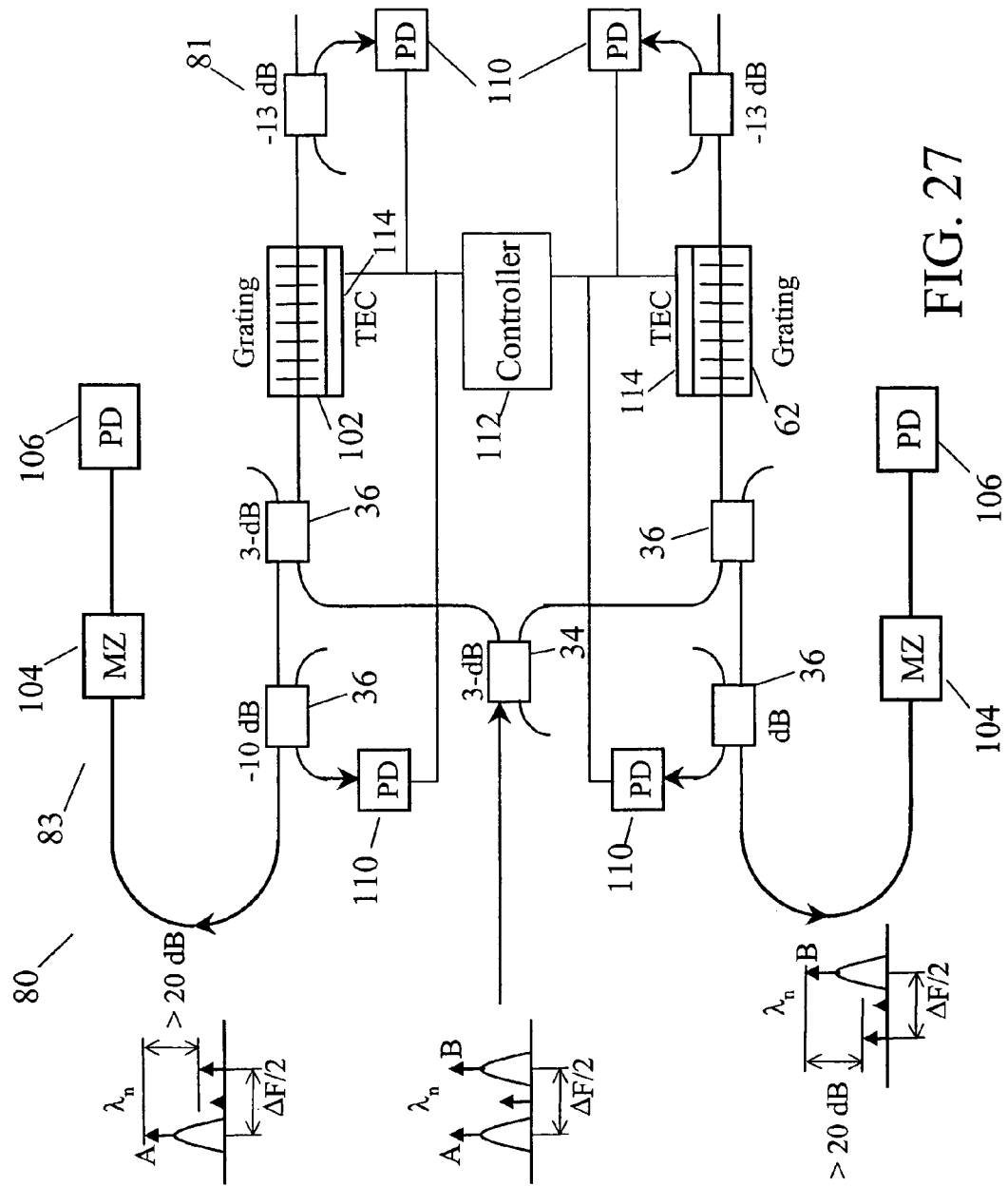

FIG. 27 shows an embodiment including a tunable fiber Bragg grating filter 102 to filter out the two information channels of an optical signal. A distributor 36 receives the optical signal and distributes the optical signal to two other distributors 36. These distributors 36 are coupled to two fiber Bragg gratings 102 that have reflection wavelengths to reflect each of the channels A and B of the optical signal. The fiber Bragg gratings 102 reflect the desired channel back to the distributor 36 attached to the fiber Bragg grating 102 input. A Mach-Zehnder filter 104, either single or double pass, is provided to filter and shape the respective channels that are reflected and pass the filtered, shaped signal channel to a photodiode 106 in a receiver 22, such as those described above, or to another optical system via an electrical to optical converter. The photodiode 106 can convert the single filtered optical channel into a single electrical signal channel. In various embodiments, the single electrical signal channel can be converted back into an optical signal either before or after additional electrical signal processing or combined with another electrical signal channel using various means, such as those described above.

Figure 28:
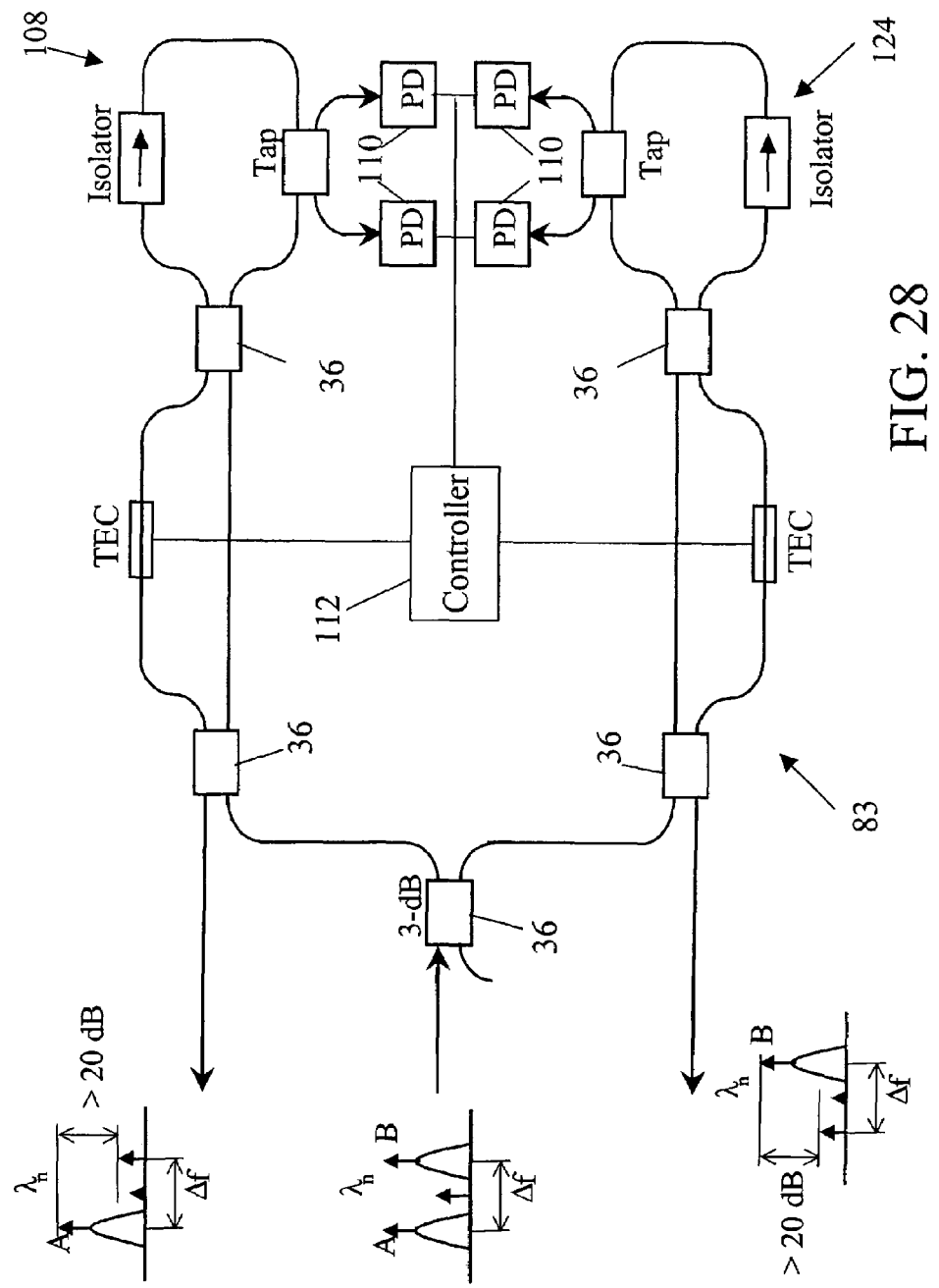

FIG. 28 shows a tunable two channel periodic optical filter 83 according to the present invention. The tunable filter 83 performs the same function as the filter in FIG. 27, but the tunable periodic filter 83 operates on two channels, which can be provided by the band filter 81 and/or another periodic filter 83. The tunable filter 106 may be implemented with a distributor 36 and two double pass Mach-Zehnder filters 108.

The distributor 36 receives the optical signal and distributes it to the two double pass Mach-Zehnder filters 108. Each double pass filter is tuned up to be centered around one of the channels. Therefore, the double pass filters only pass the desired channel. The double pass filters 108 have a center wavelength, bandwidth, and periodicity that allows for the filters 108 to pass one channel and to reject the other channel. In addition, the periodicity of the double pass filters 108 can be selected to be the same as or a multiple of the channel spacing in the optical communication system. Because of the repeating nature of the periodic filter, an upper channel, for example, on any channel will be in the passband of the double pass filter 108, and the lower channel will be rejected.

Photodiodes 110 can be used to monitor the signal passing through the double pass Mach-Zehnder filter 108. The relative magnitude of the detected power in each photodiode 110 may be used to tune the filter 108. The photodiodes 110 can be connected to a controller 112 that controls the TECs 114, which control the filter passband to track the signal channel wavelength based on the monitoring signal.

Figure 29:
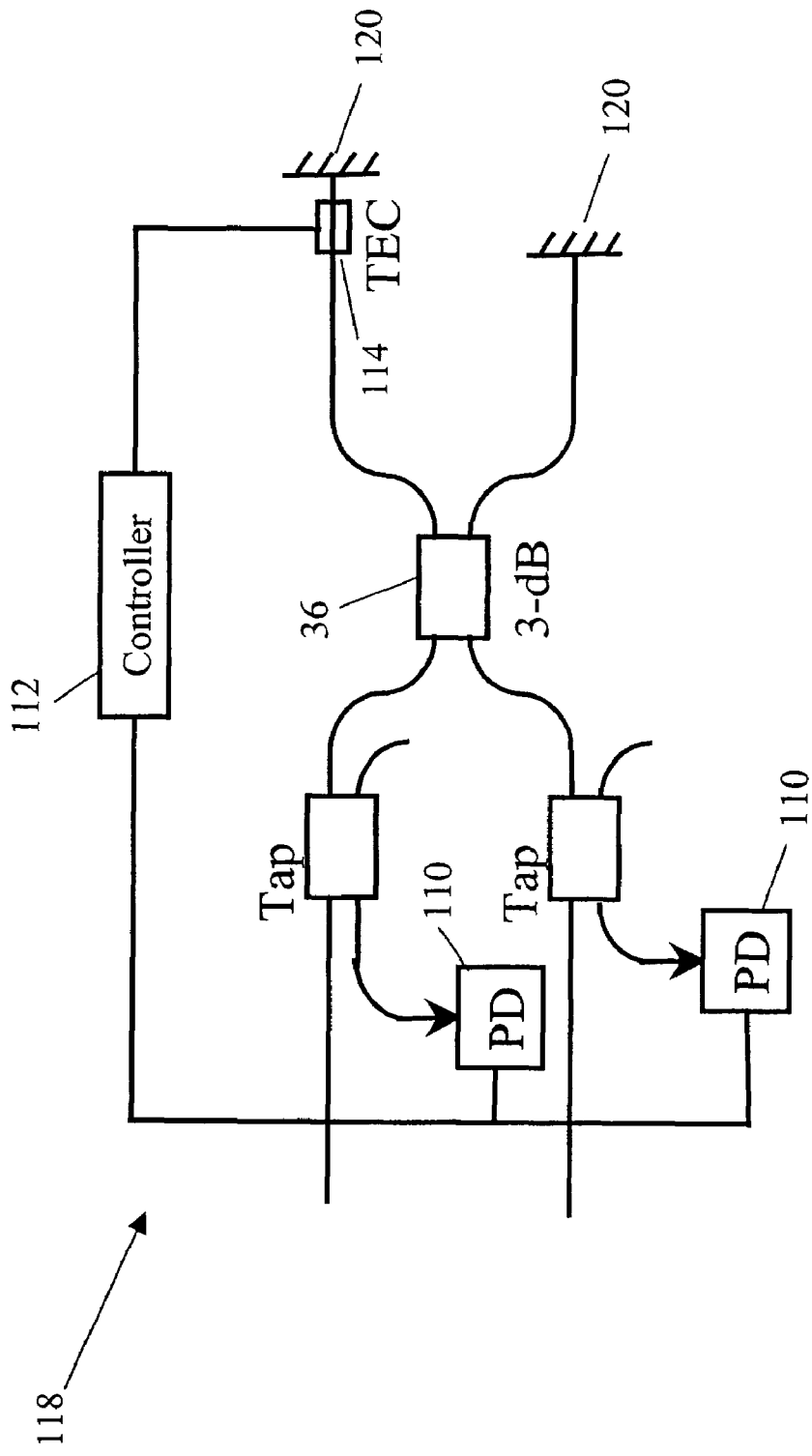

FIG. 29 shows a Michelson interferometer 118 embodiment of the periodic filter 83. The Michelson interferometer 118 can employ a distributor 36 to provide an input coupling section like the Mach-Zender interferometer. The coupling section is coupled to two fibers that are terminated with reflecting mirrors 120 that reflect the signal back towards the input coupling section. One of the fibers has a thermo-electric cooler ("TEC") 114 that can be used to vary the characteristics of the fiber resulting in function and performance like a Mach-Zehnder interferometer. The reflected signal passes through the input coupling section and is output from the filter. Another distributor 36 taps a portion of the signal along the input and output lines to the Michelson interferometer 118. The distributors 36 are connected to photodiodes 110 that can be used to detect a monitoring signal. As described above, a controller 112 receives information from the photodiodes 54 and controls the TEC 114 to tune the Michelson interferometer 68 to the desired reflection wavelength.

Because the Michelson 118 interferometer functions like a Mach-Zehnder interferometer, it may be used to implement a tunable two channel optical filter 80 as well. The configuration of the tunable filter 80 using a Michelson interferometer 118 will have to be different, because a single Michelson interferometer 118 cannot act as a double pass filter.

Figure 30:
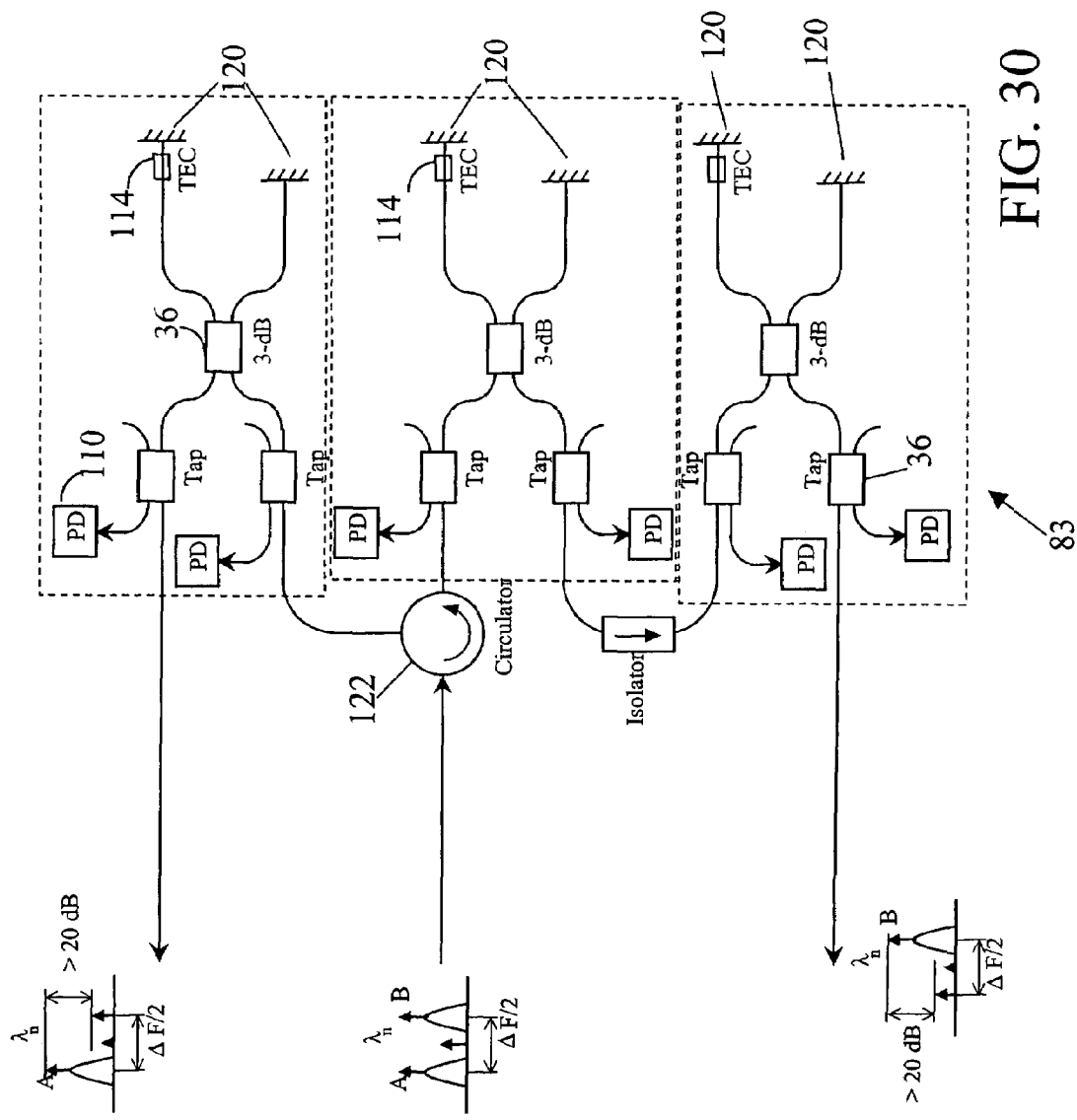

FIG. 30 shows another embodiment of a tunable two channel optical fiber 80 according to the present invention using Michelson interferometers 118. In this embodiment three Michelson interferometers 118 are interconnected to form a tunable two channel optical filter 80. A circulator 122 receives an input two channel signal, which passes through the circulator 122 to a first Michelson interferometer 118. The signal is filtered, shaped, and reflected back out of the first Michelson interferometer 118 on two output lines. One output line carries the lower channel A, and the other output line carries the upper channel B. The first output line is also the input, and the circulator 122 directs this output to the second Michelson interferometer 118. The second output passes through an isolator 124 to the third Michelson interferometer 118. The second and third Michelson interferometers 118 further filter the signals resulting in a signal that has been filtered twice as in the double pass Mach-Zehnder filter. Again, photodiodes 110 detect monitoring signal at various points in the filter 83. The photodiodes 110 are connected to a controller 112 that controls the TECs 114 and the filter passbands.

Many variations and modifications can be made to the present invention without departing from its scope. For example, advantages of the present invention can be realized with different numbers, configurations, and combinations of components in the transmitters, receivers and the system. Similarly, different numbers and forms of electrical and optical data signals can also be utilized with the present invention. Many other variations, modifications, and combinations are taught and suggested by the present invention, and it is intended that the foregoing specification and the following claims cover such variations, modifications, and combinations.

The invention claimed is:

1. An optical system comprising:
an optical transmitter configured to transmit information over two channels, each channel being at a different wavelength;
two optical filters, each of the optical filters including a band filter configured to filter at least one optical channel and a periodic filter configured to receive the at least one optical channel from said band filter and provide a single filtered optical channel and shape the bandwidth of the single filtered, shaped optical channel, wherein each of the band filters has a bandwidth at least twice as large as a periodic bandwidth of each of the periodic filters, wherein each of said band filters includes a filter selected from a group consisting of a fiber Bragg grating, a Fabry-Perot filter and a thin film filter, wherein each of said periodic filters includes a filter selected from a group consisting of a Mach-Zehnder filter, a Michelson interferometer, and an arrayed waveguide; and
an optical receiver positioned proximate the optical filter in the network and configured to receive at least two filtered shaped optical channels, wherein said optical receiver is configured to receive and convert the two filtered, shaped optical channels into two electrical signals and combine the two electrical signals into one electrical signal.

2. The system of claim 1, wherein said band filter is tunable over at least a portion of the optical system wavelength spectrum.

3. The system of claim 1, wherein said band filter is a tunable Fabry-Perot filter and said periodic filter is Mach-Zehnder filter.

4. The system of claim 3, wherein said periodic filter is a double pass Mach-Zehnder filter.

5. The system of claim 1, wherein:
said optical transmitter is one of a plurality of optical transmitter, each configured to transmit information over two channels, each channel being at a different wavelength;
said optical filter is one of a plurality of optical filters, each including a band filter configured to filter at least one optical channel and a periodic filter configured to receive the at least one optical channel from said band filter and provide a single filtered optical channel and shape the bandwidth of the single filtered, shaped optical channel; and,
said optical receiver is one of a plurality of optical receivers, each configured to receive and convert the two filtered, shaped optical channels into electrical signals and combined the two electrical signals into one electrical signal from at least one of said optical filters.

6. The optical system of claim 1, wherein:
the optical transmitter is one of a plurality of optical transmitters configured to transmit information over at least one channel, each channel being at a different wavelength; and,
the optical receiver is one of a plurality of optical receivers configured to receive at least single filtered shaped optical channel, and wherein, the optical filter is included in the optical receiver.

7. The system of claim 1, wherein the optical filter and the receiver are included within the same module, which further includes an optical transmitter for transmitting an optical signal carrying information received by the receiver.

8. The system of claim 1, wherein the periodic filter is included with the optical receiver within the same module and the band filter is not included in the module.

9. The system of claim 1, wherein the band filter is at least one of a bulk grating and an arrayed waveguide.

10. The system of claim 1, wherein the periodic filter has a periodic pass band that is adjustable via a controller based on the characteristics of the signal being received by the optical receiver.

11. The system of claim 1, wherein the system includes at least one of optical amplifiers, optical switches, and optical add-drop multiplexers.

12. The system of claim 1, wherein the band filter has a bandwidth is less than the period of the periodic filter.

13. The system of claim 1, wherein the periodic filter decreases the amount of optical noise passed by the band filter that reaches a photodiode in the optical receiver.

14. The system of claim 1, the band filter is configured to separate one channel from a plurality of optical channel, and the periodic filter filters optical noise from the one channel at wavelengths proximate to the wavelength of the one channel.

15. An optical receiver comprising:
two optical filters, each of the optical filters including a band filter configured to filter at least one optical channel and a periodic filter configured to receive the at least one optical channel from said band filter and provide a single filtered optical channel and shape the bandwidth of the single filtered, shaped optical channel, wherein each of the band filters has a bandwidth at least twice as large as a periodic bandwidth of each of the periodic filters, wherein each of said band filters includes a filter selected from a group consisting of a fiber Bragg grating, a Fabry-Perot filter and a thin film filter, and wherein each of said periodic filters includes a filter selected from a group consisting of a Mach-Zehnder filter, a Michelson interferometer, and an arrayed waveguide; and
a photodiode configured to receive the two filtered, shaped optical channels and convert them into two electrical signals.

16. A method of receiving an optical signal comprising:
receiving two optical channels, each optical channel being at a different wavelength;
filtering the two optical channels using two optical filters, each of the optical filters including a band filter configured to filter at least one optical channel and each of the optical filters including a periodic filter configured to receive at least one of the optical channels from one of the band filters and provide a single filtered optical channel and shape the bandwidth of the single filtered, shaped optical channel, wherein each of the band filters has a bandwidth at least twice as large as a periodic bandwidth of each of the periodic filters, wherein each of said band filters includes at least one filter selected from a group consisting of a fiber Bragg grating, a Fabry-Perot filter and a thin film filter, and wherein each said periodic filters includes a filter selected from a group consisting of a Mach-Zehnder filter, a Michelson interferometer, and an arrayed waveguide;
converting the two filtered, shaped optical channels into electrical signals; and
combining the two electrical signals into one electrical signal.

* * * * *